United States Patent
Saldamli et al.

(10) Patent No.: US 9,635,053 B2
(45) Date of Patent: Apr. 25, 2017

(54) COMPUTING SYSTEM WITH PROTOCOL PROTECTION MECHANISM AND METHOD OF OPERATION THEREOF

(71) Applicant: Samsung Electronics Co., Ltd., Suwon-si, Gyeonggi-Do (KR)

(72) Inventors: Gokay Saldamli, San Jose, CA (US); Richard Chow, Sunnyvale, CA (US); Hongxia Jin, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 73 days.

(21) Appl. No.: 14/184,563

(22) Filed: Feb. 19, 2014

(65) Prior Publication Data

US 2014/0237623 A1    Aug. 21, 2014

Related U.S. Application Data

(60) Provisional application No. 61/767,381, filed on Feb. 21, 2013.

(51) Int. Cl.
*H04L 29/06* (2006.01)
*G06F 21/60* (2013.01)
(Continued)

(52) U.S. Cl.
CPC ............ *H04L 63/16* (2013.01); *G06F 21/606* (2013.01); *G06F 21/6245* (2013.01); *H04W 12/02* (2013.01); *H04L 63/0281* (2013.01); *H04L 63/162* (2013.01); *H04L 63/164* (2013.01); *H04L 63/166* (2013.01); *H04L 63/168* (2013.01)

(58) Field of Classification Search
CPC ... G06F 21/606; G06F 21/6245; H04L 63/20; H04L 63/029; H04L 67/42; H04L 63/0281; H04L 63/0428; H04L 63/205; H04L 63/16; H04L 63/162; H04L 63/164; H04L 63/166; H04L 63/168; H04W 12/02
See application file for complete search history.

(56) References Cited

U.S. PATENT DOCUMENTS

2002/0161895 A1* 10/2002 Appiah et al. ................ 709/227
2007/0223463 A1*  9/2007 Weinberger ............ H04L 12/58
                                                            370/356
(Continued)

OTHER PUBLICATIONS

Kido et al., "An Anonymous Communication Technique using Dummies for Location-based Services", Jun. 2005, pp. 88-97 http://ieeexplore.ieee.org/xpls/abs_all.jsp?arnumber=1506394&tag=1.*
(Continued)

*Primary Examiner* — Robert Leung
*Assistant Examiner* — Carlos M De Jesus Lassala
(74) *Attorney, Agent, or Firm* — IP Investment Law Group

(57) ABSTRACT

A computing system includes: a control unit configured to: determine a protocol profile including a first protocol and a second protocol for communicating between a first device and a second device, generate a unified-protocol privacy mechanism for a privacy protection scenario, the unified-protocol privacy mechanism based on combining the first protocol and the second protocol; and a communication unit, coupled to the control unit, configured to communicate content information according to the unified-protocol privacy mechanism between the first device and the second device.

17 Claims, 8 Drawing Sheets

(51) Int. Cl.
*H04W 12/02* (2009.01)
*G06F 21/62* (2013.01)

(56) References Cited

U.S. PATENT DOCUMENTS

| | | | | |
|---|---|---|---|---|
| 2008/0317002 A1* | 12/2008 | Boppana | ......... | H04L 69/32 370/352 |
| 2010/0087179 A1* | 4/2010 | Makavy | ......... | H04L 67/36 455/418 |
| 2014/0123169 A1* | 5/2014 | Koukarine | ......... | H04N 21/2347 725/31 |

OTHER PUBLICATIONS

Zhang et al., "Fine-grained Private Matching for Proximity-based Mobile Social Networking", Mar. 2012, pp. 1969-1977 http://ieeexplore.ieee.org/xpls/abs_all.jsp?arnumber=6195574.*

Narayanan et al., "Location Privacy via Private Proximity Testing", Dec. 2010, pp. 1-17, http://crypto.stanford.edu/~dabo/pubs/papers/locpriv.pdf.*

* cited by examiner

COMPUTING SYSTEM WITH PROTOCOL PROTECTION MECHANISM AND METHOD OF OPERATION THEREOF

CROSS-REFERENCE TO RELATED APPLICATION(S)

This application claims the benefit of U.S. Provisional Patent Application Ser. No. 61/767,381 filed Feb. 21, 2013, and the subject matter thereof is incorporated herein by reference thereto.

TECHNICAL FIELD

An embodiment of the present invention relates generally to a computing system, and more particularly to a system with a protocol protection mechanism.

BACKGROUND

Modern consumer and industrial electronics, especially devices such as computing systems, cellular phones, portable digital assistants, and combination devices are providing increasing levels of functionality to support modern life including online social networks. Research and development in the existing technologies can take numerous different directions.

As users become more empowered with the growth in computing, various uses begin to take advantage of this new device space. One such advancement has been protecting sensitive or private information. However, the rapid growth in consumer electronics and the increase in unauthorized access and usage of personal data have presented new challenges for the users.

Thus, a need still remains for a computing system with protocol protection mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: a control unit configured to: determine a protocol profile including a first protocol and a second protocol for communicating between a first device and a second device, generate a unified-protocol privacy mechanism for a privacy protection scenario, the unified-protocol privacy mechanism based on combining the first protocol and the second protocol; and a communication unit, coupled to the control unit, configured to communicate content information according to the unified-protocol privacy mechanism between the first device and the second device.

An embodiment of the present invention provides a method of operation of a computing system including: determining a protocol profile including a first protocol and a second protocol for communicating between a first device and a second device; generating a unified-protocol privacy mechanism with a control unit for a privacy protection scenario, the unified-protocol privacy mechanism based on combining the first protocol and the second protocol; and communicating content information according to the unified-protocol privacy mechanism between the first device and the second device.

An embodiment of the present invention provides a non-transitory computer readable medium including instructions for operating a computing system including: determining a protocol profile including a first protocol and a second protocol for communicating between a first device and a second device; generating a unified-protocol privacy mechanism for a privacy protection scenario, the unified-protocol privacy mechanism based on combining the first protocol and the second protocol; and communicating content information according to the unified-protocol privacy mechanism between the first device and the second device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
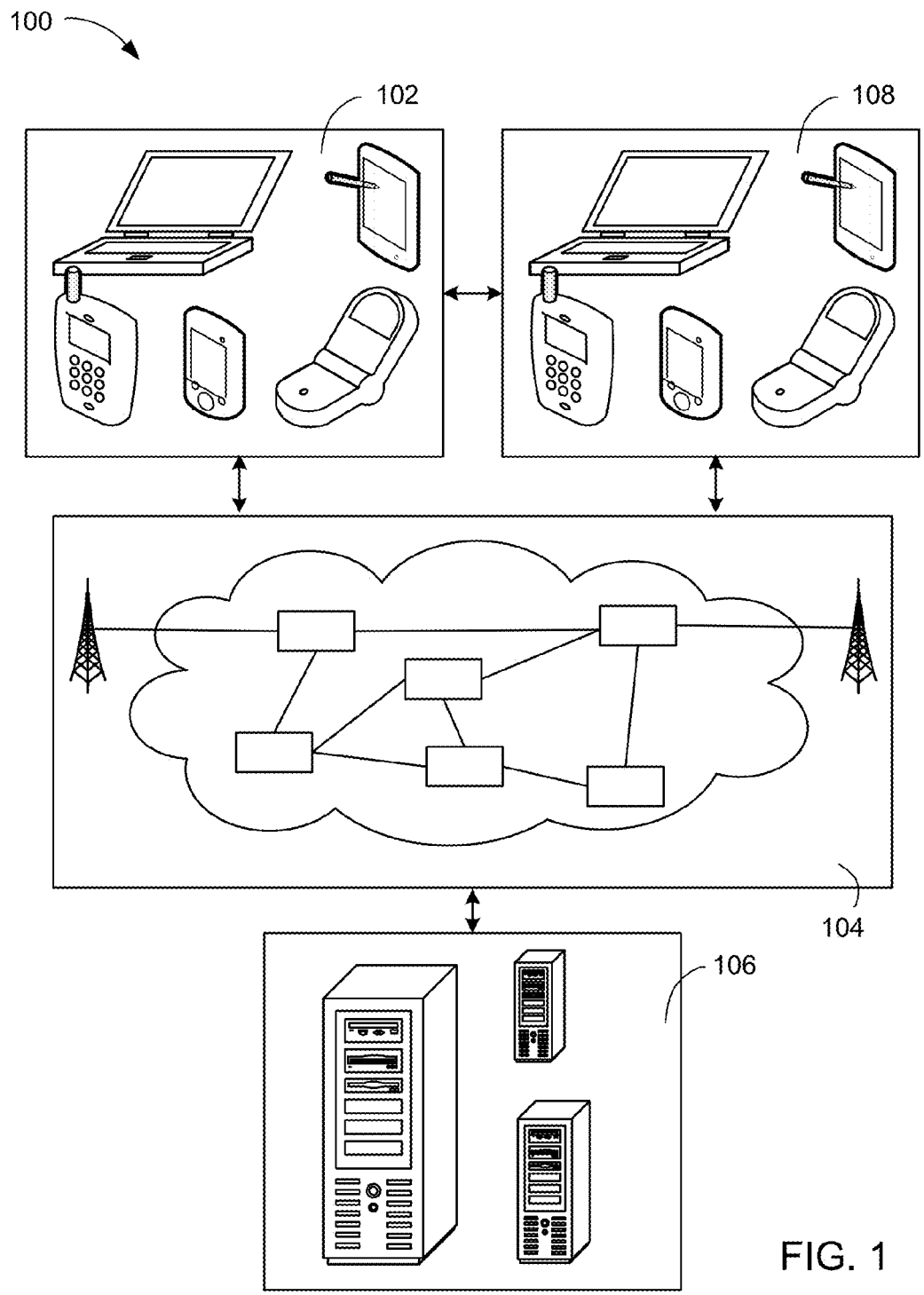
FIG. 1 is a computing system with protocol protection mechanism in an embodiment of the present invention.

The following embodiments of the present invention can be used to protect user information, including information associated with a social network service. Content information for or utilizing the social network service can be protected according to a privacy protection scenario and independent of a content encryption mechanism by unifying instances of exchange protocol used in communicating the content information.

A protocol profile can be determined for the instances of the exchange protocol, such as for a first protocol and a second protocol. A unified-protocol privacy mechanism can be generated based on the protocol profile for unifying the instances of the exchange protocol. The unified-protocol privacy mechanism can be generated by combining the instances of the exchange protocol, such as by combining the first protocol and the second protocol.

The unified-protocol privacy mechanism can utilize a placeholder content, a placeholder node, or a combination thereof for unifying the instances of the exchange protocol.

A cache-communication profile can be further generated and utilized to protect the user sharing patterns.

The unified-protocol privacy mechanism combining multiple instances of the exchange protocol for the privacy protection scenario provides increased protection for the content information from access by an unintended observer. The unified-protocol privacy mechanism utilizing the placeholder content, the placeholder node, or a combination thereof provides increased security and robustness. The cache-communication profile utilizing the placeholder content for the privacy protection scenario provides increased protection.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes filtering signals, decoding symbols, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with protocol protection mechanism in an embodiment of the present invention. The computing system 100 includes a first device 102, such as a mobile device including a cellular phone or a notebook computer, connected to a network 104.

The first device 102 can be a client or a server. For example, the first device 102 can be of any of a variety of devices, such as a smartphone, a cellular phone, personal digital assistant, a tablet computer, a notebook computer, or other multi-functional display or entertainment device. The first device 102 can couple, either directly or indirectly, to the network 104 for exchanging information with other devices.

The network 104 is a system of wired or wireless communication devices that are connected to each other for enabling communication between devices. For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The network 104 can span and represent a variety of network types and network topologies. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the network 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

Device users (not shown) can communicate with each other or access or create information using devices including text, images, symbols, location information, and audio, as examples. The users can be individuals or enterprise companies. The information can be created directly from a user or operations performed on these information to create more or different information.

The computing system 100 can include a second device 106 for directly or indirectly linking and communicating with the first device 102. The second device 106 can link or communicate with the first device 102 through the network 104. The second device 106 can receive wireless signals from the first device 102, transmit signals to the first device 102, process signals, or a combination thereof. The second device 106 can also relay signals between other base stations, components within the network 104, or a combination thereof.

The second device 106 can be any of a variety of centralized or decentralized computing devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a recording device, such as a camera or video camera, or a combination thereof. In another example, the second device 106 can be a server at a service provider or a computing device at a transmission facility.

The computing system 100 can include a third device 108 for directly or indirectly linking and communicating with the first device 102, the second device 106, or a combination thereof. The third device 108 can link or communicate with the first device 102 directly or through the network 104. The third device 108 can similarly link or communicate with the second device 106.

For illustrative purposes, the computing system 100 is described with the first device 102 and the third device 108 as consumer devices or portable devices, and with the second device 106 as a stationary or an enterprise device. However, it is understood that the first device 102, the third device 108, and the second device 106 can be any variety of devices. For example, the first device 102, the third device 108, or a combination thereof can be a stationary device or an enterprise system, such as a television or a server. Also for example, the second device 106 can be a consumer device or a portable device, such as a smart phone or a wearable device.

The first device 102, the second device 106, the third device 108, or a combination thereof can connect to and communicate with other devices, such as other mobile devices, servers, computers, telephones, or a combination thereof. For example, the first device 102, the second device 106, the third device 108, or a combination thereof can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof.

For illustrative purposes, the computing system 100 is described with the first device 102 as a portable multifunctional device, although it is understood that the first device 102 can be different types of devices. For example, the first device 102 can also be a workstation or a multimedia presentation, such as be a presentation including sound, a sequence of streaming images or a video feed, text or a combination thereof.

For further illustrative purposes, the computing system 100 is described with the second device 106 as a computing device and as a server, although it is understood that the second device 106 can be different types of devices as described above. Also for illustrative purposes, the computing system 100 is shown with the second device 106, the first device 102, and the third device 108 as end points of the network 104, although it is understood that the computing system 100 can have a different partition between the first device 102, the second device 106, the third device 108, and the network 104. For example, the first device 102, the second device 106, the third device 108, or a combination thereof can also function as part of the network 104.

Figure 2:
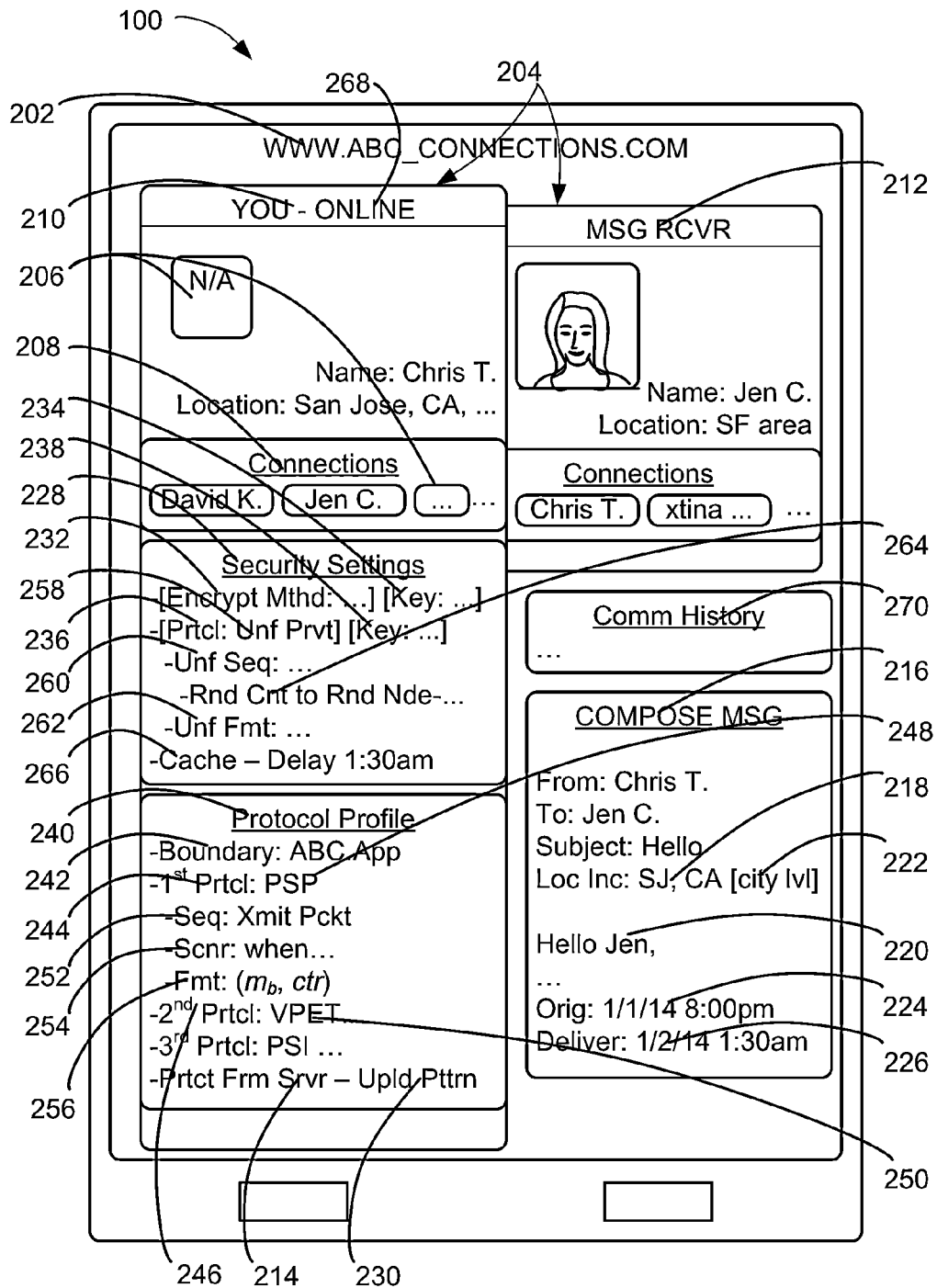
FIG. 2 is an example display of the first device.

Referring now to FIG. 2, therein is shown an example display of the first device 102. The first device 102 can show a social network service 202. The social network service 202 is a facility or a provider for facilitating or providing a social structure or a set of connections between a set of social actors or users. The social network service 202 can include a set of dyadic ties between the social actors or the users. For example, the social network service 202 can include Facebook™, Twitter™, LinkedIn™, Pinterest™, Snapchat™, Tumblr™, Line™, WhatsApp™, Foursquare™, or other similar services.

The social network service 202 can include individual accounts 204 each representing information corresponding to a user, a group, an organization, an entity, or a combination thereof. The individual accounts 204 can include a profile, a connection list, a webpage, a message authored by the user or other users, schedules or dates, or a combination thereof for the user associated with the individual accounts 204.

Each of the individual accounts 204 can include one or more instances of a feature 206. The feature 206 is a unit of information. The feature 206 can include a letter, a number, a pointer or a link, an address, visual data, audible data, an instruction, or a combination thereof. The feature 206 can include a unit of information corresponding to a known or a commonly accepted category, a logical or an abstract meaning or significance, or a combination thereof. For example, the feature 206 can include an account identification, an account connection 208, or a combination thereof.

The account identification can include a letter, a number, a symbol, or a combination thereof representing the user, the group, the organization, the entity, or a combination thereof owning, controlling, or a combination thereof for the individual accounts 204. The account identification can include a name, a sign, an image, a screen name, an address, or a combination thereof.

The account connection 208 is a representation of a separate person or a separate entity, different from and associated with the person or the entity represented by corresponding instance of the individual accounts 204. The account connection 208 can represent a relationship between instances of the individual accounts 204. The account connection 208 can represent the structural information of the social network service 202.

For example, the account connection 208 can include data, the account identification, a link to, a description, or a combination associated with one or more instances of the individual accounts 204 belonging to a friend, a colleague, an acquaintance, or a combination thereof. Also for example, the account connection 208 can include data, a description, or a combination describing a friend, a colleague, an acquaintance, or a combination thereof.

The computing system 100 can enable exchange of data between various users. The computing system 100 can include the social network service 202 enabling communication between the individual accounts 204. For example, the social network service 202 can include a source account 210 and a receiver account 212.

The source account 210 is an instance of the individual accounts 204 transmitting information. The receiver account 212 is an instance of the individual accounts 204 receiving the information sent from the source account 210. The receiver account 212 can be an intended user of the communicated information.

An unintended observer 214 can exist relative to the source account 210 and the receiver account 212. The unintended observer 214 is a person, a group, or an entity apart from users of the source account 210 and the receiver account 212.

The unintended observer 214 can include the person, the group, or the entity accessing or attempting to access the feature 206, the communicated information, or a combination thereof from the source account 210, the receiver account 212, there-between, or a combination thereof without permission from the source account 210, the receiver account 212, or a combination thereof. For example, the unintended observer 214 can include the social network service 202, a server, a service provider, a hacker, an unintended recipient, or a combination thereof not intended as the final recipient of the information.

The computing system 100 can communicate content information 216 between the first device 102, the second device 106 of FIG. 1, the third device 108 of FIG. 1, or a combination thereof. The content information 216 is data communicated between the first device 102, the second device 106, the third device 108, or a combination thereof. The content information 216 can be the data communicated between the source account 210 and the receiver account 212.

The content information 216 can include a relevant location 218, a message 220, a privacy rating 222, or a combination thereof. The relevant location 218 is a geographic location or area associated with the person or the entity associated with the content information 216. The relevant location 218 can include the geographic location of the associated device, such as the first device 102, the second device 106, the third device 108, or a combination thereof, the user, or a combination thereof.

For example, the relevant location 218 can include a current location of the first device 102, the second device 106, the third device 108, the source account 210, the receiver account 212, or a combination thereof at the time of transmitting or receiving the content information 216. Also for example, the relevant location 218 can include a current location, a residential or a professional location, or a combination thereof of the user associated with the first device 102, the second device 106, the third device 108, the source account 210, the receiver account 212, or a combination thereof.

The message 220 can be a letter, a number, a symbol, an image, a sound, or a combination thereof for communicating data to the user of the receiver account 212. For example, the message 220 can include a note, a text message, an email, a picture, a sound file, a derivation thereof or a combination thereof.

The privacy rating 222 is a description of a limitation in accessing the content information 216. The privacy rating 222 can include settings limiting the access to only the receiver account 212, a device or the user associated therewith, or a combination thereof. The privacy rating 222 can further include a public setting accessible to anyone or without a specific requirement, a selective setting accessible based on meeting the specific requirement, or a combination thereof.

For example, the user of the source account 210 can utilize the first device 102 to communicate the content information 216. As a more specific example, the user can use the first device 102 to transmit the relevant location 218 representing a current location of the user.

Continuing with the example, the first device 102 can transmit the content information 216 to the receiver account 212 through the second device 106, such as a server, a router, the social network service 202, or a combination thereof. The second device 106 can receive the content information 216 from the first device 102 and transmit the content information 216 to receiver account 212, the third device 108, or a combination thereof associated with a further user. The further user can access the content information 216, the receiver account 212, or a combination thereof utilizing the third device 108.

The user can communicate the content information 216 at a content origination time 224. The content origination time 224 is a representation of time when the user sends or transmits the content information 216. The content origination time 224 can be the time when the user saves the content information 216, initiates or enables the communication function, or a combination thereof.

The content information 216 can be further communicated at a content share time 226. The content share time 226 is a representation of time when the content information 216 is sent to the receiver account 212. The content share time 226 can be same as or different from the content origination time 224. The computing system 100 can send the content information 216 to the receiver account 212, the further user or any device associated therewith, or a combination thereof after a designated delay.

Continuing with the example, the computing system 100 can receive or store the content information 216 from the user through the source account 210 using the first device 102 at the content origination time 224. The computing system 100 can store or hold the content information 216 at the first device 102, transmit to and store the content information 216 at the second device 106, such as the server or the social network service 202, or a combination thereof. The computing system 100 can transmit the content information 216 to the receiver account 212, the third device 108 or the further user associated therewith, or a combination thereof immediately or after the designated delay according to the content share time 226.

The computing system 100 can utilize various processes and mechanisms for a privacy protection scenario 228. The privacy protection scenario 228 is a goal, a result, a requirement for protecting user's information. The computing system 100 can protect information regarding the user from being accessed by the unintended observer 214.

The privacy protection scenario 228 can be different from an efficiency scenario and increase a processing time, a processing burden, a required storage space, a required bandwidth, or a combination thereof. The privacy protection scenario 228 can utilize a hardware device, an operating system, an application, a derivation thereof, a portion therein, or a combination thereof.

The privacy protection scenario 228 can include obscuring, adding, reordering, deleting, or a combination thereof for the content information 216. The privacy protection scenario 228 can utilize predetermined or recognizable formats, codes, or a combination thereof for only the receiver account 212. The privacy protection scenario 228 can prevent or aim to prevent the unintended observer 214 not having the predetermined or recognizable formats, the codes, or a combination thereof from accessing the content information 216.

For example, the computing system 100 can limit or restrict the unintended observer 214, a device, a different user, or a combination thereof from accessing the content information 216 inconsistent with the privacy rating 222. Also for example, the unintended observer 214 can use the content share time 226 to determine a content share pattern 230.

The content share pattern 230 can include data or information regarding the user of the source account 210 or the further user of the receiver account 212. For example, the content share pattern 230 can include a time, a method, a condition associated therewith, or a combination thereof the user or the further user communicating information, utilizing the social network service 202, associated devices, or a combination thereof.

The computing system 100 can use a content encryption mechanism 232 to protect the content information 216. The content encryption mechanism 232 is a process of encoding information for limiting access thereto. The content encryption mechanism 232 can encode the content information 216 for preventing access thereto by the unintended observer 214. For example, the content encryption mechanism 232 can include symmetric key encryption or the public key encryption. Also for example, the content encryption mechanism 232 can include or utilize an encryption key 234.

The encryption key 234 is information or parameter for processing information for encryption, decryption, or a combination thereof. The encryption key 234 can be the information or the parameter for transforming the content information 216 into an encrypted result, transforming the encrypted result back to the content information 216, or a combination thereof. The source account 210, the receiver account 212, the device associated therewith, or a combination thereof can include the encryption key 234. The computing system 100 can exclude the encryption key 234 from the unintended observer 214 for the privacy protection scenario 228.

The computing system 100 can use an exchange protocol 236 to communicate the content information 216. The exchange protocol 236 is a system of rules for exchanging or communicating data between devices. The exchange protocol 236 can be for communicating between the first device 102, the second device 106, the third device 108, or a combination thereof. The exchange protocol 236 can include a sequence of steps or data, a specific order or format within communicated data, a time associated with exchange of information, a limitation on possible data, an error-detection or an error-correction information, or a combination thereof.

The unintended observer 214 can further infer information regarding the user or the content information 216 based on the exchange protocol 236. For example, the social network service 202 can utilize different instances of the exchange protocol 236 for sharing different types of the content information 216, different levels of granularity, based on different circumstances, or a combination thereof.

As a more specific example, the social network service 202 can use one instance of the exchange protocol 236 for sharing the relevant location 218 at a larger granularity, such as at a city or a town level. The social network service 202 can use a different instance of the exchange protocol for sharing the relevant location 218 at a smaller granularity, such as using exact coordinates or block level.

Continuing with the example, the unintended observer 214 can determine or infer data regarding the content information 216 based on the exchange protocol 236 used to communicate the content information 216. As a more specific example, the unintended observer 214 can determine the granularity, circumstances, types, or a combination thereof regarding the relevant location 218 based on a timing, a sequence, a quantity, or a combination thereof for exchanges between devices. The unintended observer 214 can determine the exchange protocol 236 based on the timing, the sequence, the quantity, or a combination thereof for exchanges and infer data regarding the content information 216 including the relevant location 218.

The computing system 100 can use a protocol key 238, a protocol profile 240, or a combination thereof to protect user's information. The protocol key 238 is information or parameter for processing information for processing the exchange protocol 236. The protocol key 238 can be similar to the encryption key 234 but for processing the exchange protocol 236 instead of the content encryption mechanism 232.

The protocol key 238 can include a password, the encryption key 234 for accessing or utilizing a predetermined set of commands, sequences, timing, or a combination thereof. The protocol key 238 can include a value, a format or an order of information, or a combination thereof.

The protocol profile 240 is a description regarding the exchange protocol 236 according to a profile boundary 242. The profile boundary 242 is a limitation or a range for the protocol profile 240. The profile boundary 242 can include a single instance of software or application, an operating system, a device, or a combination thereof. The protocol profile 240 can include instances of the exchange protocol 236 possible for use within the profile boundary 242, details therein, or a combination thereof.

For example, the protocol profile 240 can include a first protocol 244, a second protocol 246, or a combination thereof. The first protocol 244 can be an instance of the exchange protocol 236, and the second protocol 246 can be an instance of the exchange protocol 236 different from the first protocol 244. As a more specific example, the protocol profile 240 can include a private sharing mechanism 248 as the first protocol 244, the vector testing mechanism 250 for the second protocol 246, or a combination thereof.

The private sharing mechanism 248 is a protocol for exchanging the relevant location 218 using the content encryption mechanism 232. The private sharing mechanism 248 can only use the content encryption mechanism 232 for preventing access by the unintended observer 214. Details regarding the private sharing mechanism 248 will be described below.

The vector testing mechanism 250 is a protocol for exchanging the relevant location 218 using a proximity test with a Private Equality Testing (PET). The vector testing mechanism 250 can be a different protocol from the private sharing mechanism 248. The vector testing mechanism 250 can be more complex than the private sharing mechanism 248. For example, the vector testing mechanism 250 can include or require different or additional exchanges. Also for example, the vector testing mechanism 250 can include or require additional, different, more complex, or a combination thereof for the information within one or more of the exchanges. Details regarding the vector testing mechanism 250 will be described below.

For illustrative purposes, the protocol profile 240 is described as including two instances of the exchange protocol 236. However, it is understood that the protocol profile 240 can include any number of instances of the exchange protocol 236 utilized or accessible within the profile boundary 242, such as for a device or an application. For example, the protocol profile 240 can additionally include a Private Set Intersection (PSI) protocol as a third instance of the exchange protocol 236.

The protocol profile 240 can include a protocol sequence 252, a protocol scenario 254, a field format 256, or a combination thereof. The protocol sequence 252 is an order for exchanging data, such as for communicating parties or type of communicated information. The protocol sequence 252 can describe the order for the instances of the exchange protocol 236 included in the protocol profile 240, including the first protocol 244, the second protocol 246, or a combination thereof.

The protocol scenario 254 is one or more conditions or requirements corresponding to instances of the exchange protocol within the protocol profile 240. For example, the protocol scenario 254 can specify one or more conditions for utilizing the instances of the exchange protocol 236 included in the protocol profile 240, including the first protocol 244, the second protocol 246, or a combination thereof.

The field format 256 is an order or a requirement for a type of data within an exchanged data for each instance of the exchanges in the protocol sequence 252. The field format 256 can include a meaning or a purpose for each unit of information described by the field format 256. For example, the field format 256 can describe a meaning, a purpose, an order, or a combination thereof within one or more packets of information in each instance of the exchanges.

The computing system 100 can further generate and use a unified-protocol privacy mechanism 258 to protect the user's information. The unified-protocol privacy mechanism 258 is an instance of the exchange protocol 236 for use independent of the protocol scenario 254. The unified-protocol privacy mechanism 258 can be utilized for all situations or conditions described in the protocol scenario 254 instead of the specific instances of the exchange protocol 236 associated therewith.

The unified-protocol privacy mechanism 258 can be for the privacy protection scenario 228. The unified-protocol privacy mechanism 258 can prevent the unintended observer 214 from obtaining data regarding the content information 216 through the exchange protocol 236.

The unified-protocol privacy mechanism 258 can be a combination of the instances of the exchange protocol 236 described by the protocol profile 240 including the first protocol 244, the second protocol 246, or a combination thereof. For example, the unified-protocol privacy mechanism 258 can be a combined instance of the first protocol 244 and the second protocol 246, such as a combination of the private sharing mechanism 248 and the vector testing mechanism 250.

The unified-protocol privacy mechanism 258 can include a unified sequence 260, a unified format 262, or a combination thereof. The unified-protocol privacy mechanism 258 can be without a unified scenario since the unified-protocol privacy mechanism 258 can replace different instances of the exchange protocol 236 for the profile boundary 242.

The unified sequence 260 is an order for exchanging data, such as for communicating parties or type of communicated information for the unified-protocol privacy mechanism 258. The unified sequence 260 can include the order combining or unifying the protocol sequence 252 for the exchange protocol 236 included in the protocol profile 240. For example, the unified sequence 260 can combine the exchange protocol 236 for the first protocol 244 and the second protocol 246, such as for the private sharing mechanism 248 and the vector testing mechanism 250.

The unified format 262 is an order or a requirement for a type of data within an exchanged data for each instance of the exchanges in the unified sequence 260. The unified format 262 can include the order or the requirement combining or unifying the field format 256 for the exchange protocol 236 included in the protocol profile 240.

For example, the unified format 262 can combine the field format 256 for the first protocol 244 and the second protocol 246, such as for the private sharing mechanism 248 and the vector testing mechanism 250. Also for example, the unified format 262 can describe a meaning, a purpose, an order, or a combination thereof within one or more packets of information in each instance of the exchanges for the unified-protocol privacy mechanism 258.

The computing system 100 can further utilize a placeholder content 264, a cache-communication profile 266, or a combination thereof to protect the user's information. The placeholder content 264 is data unrelated to the content information 216. The computing system 100 can generate the placeholder content 264 for protecting the content information 216.

The placeholder content 264 can include random data or data independent of the content information 216. The placeholder content 264 can also be based on the content information 216. The receiver account 212 can recognize, ignore, discard, or a combination thereof for the placeholder content 264 based on the unified-protocol privacy mechanism 258, the protocol key 238, or a combination thereof.

The cache-communication profile 266 is a description for a timing of communicating the content information 216. The cache-communication profile 266 can include the delay from the content origination time 224 to the content share time 226. The computing system 100 can use the cache-communication profile 266 to delay the communication to the content share time 226 instead of immediately communicating the content information 216 at the content origination time 224.

The computing system 100 can use the cache-communication profile 266 independent of an online status 268, such as based on the user accessing or utilizing the social network service 202 or the network 104 of FIG. 1. The computing system 100 can use the cache-communication profile 266 to create a difference between the content origination time 224 and the content share time 226.

The computing system 100 can further determine a communication history 270. The communication history 270 is a record of prior communication for the source account 210, the receiver account 212, or a combination thereof. The communication history 270 can include an existence of a prior communication between specific instances of the individual accounts 204, between devices, between users, or a combination thereof. The communication history 270 can further include a time, a content, a size, any detail or metadata, or a combination thereof regarding the prior communication.

Figure 3:
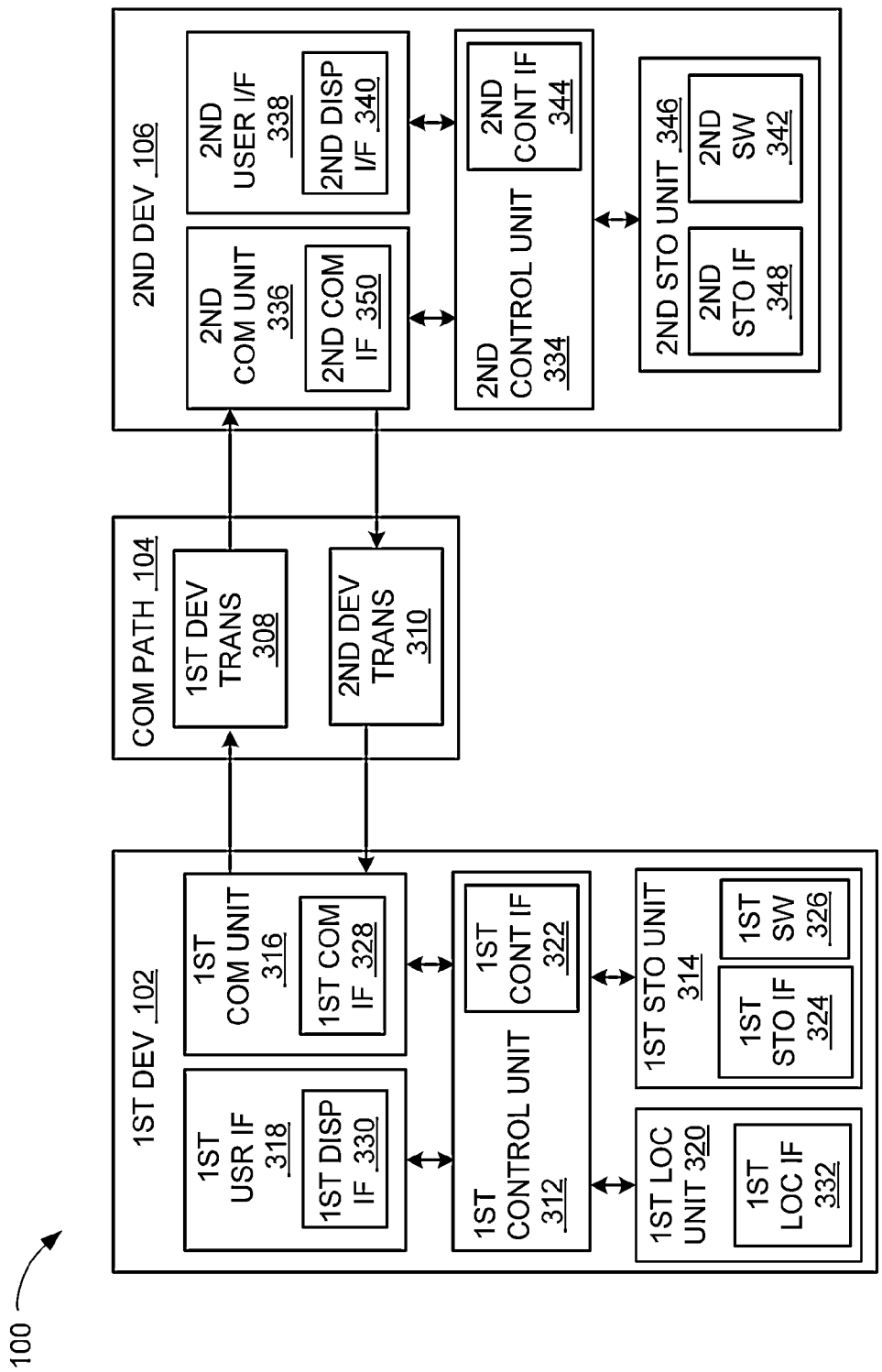
FIG. 3 is an example block diagram of the computing system.

Referring now to FIG. 3, therein is shown an exemplary block diagram of the computing system 100. The computing system 100 can include the first device 102, the network 104, and the second device 106. The first device 102 can send information in a first device transmission 308 over the network 104 to the second device 106. The second device 106 can send information in a second device transmission 310 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, a first user interface 318, and a first location unit 320. The first control unit 312 can include a first control interface 322. The first control unit 312 can execute a first software 326 to provide the intelligence of the computing system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof.

The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the first storage unit 314 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, a different device, an attachment, such as a peripheral device or a desktop computer, the network 104, or a combination thereof.

The first communication unit 316 can also function as a communication hub allowing the first device 102 to function as part of the network 104 and not limited to be an end point or terminal unit to the network 104. The first communication unit 316 can include active and passive components, such as microelectronics or an antenna, for interaction with the network 104.

The first communication unit 316 can include a baseband device or component, a modem, a digital signal processor, or a combination thereof for transmitting, formatting, receiving, detecting, decoding, further processing, or a combination thereof for communication signals. The first communication unit 316 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 316 can further include one or more portions for storing information, such as cache or RAM memory, registers, or a combination thereof.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control unit 312 can operate the first user interface 318 to display information generated by the computing system 100. The first control unit 312 can also execute the first software 326 for the other functions of the computing system 100, including receiving location information from the first location unit 320. The first control unit 312 can further execute the first software 326 for interaction with the network 104 via the first communication unit 316.

The first location unit 320 can generate location information, current heading, current acceleration, and current speed of the first device 102, as examples. The first location unit 320 can be implemented in many ways. For example, the first location unit 320 can function as at least a part of the global positioning system, an inertial computing system, a cellular-tower location system, a pressure location system, or any combination thereof. Also, for example, the first location unit 320 can utilize components such as an accelerometer or GPS receiver.

The first location unit 320 can include a first location interface 332. The first location interface 332 can be used for communication between the first location unit 320 and other functional units in the first device 102. The first location interface 332 can also be used for communication external to the first device 102.

The first location interface 332 can receive information from the other functional units or from external sources, or can transmit information to the other functional units or to external destinations. The external sources and the external destinations refer to sources and destinations external to the first device 102.

The first location interface 332 can include different implementations depending on which functional units or external units are being interfaced with the first location unit 320. The first location interface 332 can be implemented with technologies and techniques similar to the implementation of the first control unit 312.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, a second user interface 338, and a second storage unit 346.

The second user interface 338 allows a user (not shown) to interface and interact with the second device 106. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the computing system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the computing system 100, including operating the second communication unit 336 to communicate with the first device 102 over the network 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the second storage unit 346 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the network 104.

The second communication unit 336 can also function as a communication hub allowing the second device 106 to function as part of the network 104 and not limited to be an end point or terminal unit to the network 104. The second communication unit 336 can include active and passive components, such as microelectronics or resistors, for interaction with the network 104.

The second communication unit 336 can include a baseband device or component, a modem, a digital signal processor, or a combination thereof for transmitting, formatting, receiving, detecting, decoding, further processing, or a combination thereof for communication signals. The second communication unit 336 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 316 can further include one or more portions for storing information, such as cache or RAM memory, registers, or a combination thereof.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the network 104 to send information to the second device 106 in the first device transmission 308. The second device 106 can receive information in the second communication unit 336 from the first device transmission 308 of the network 104.

The second communication unit 336 can couple with the network 104 to send information to the first device 102 in the second device transmission 310. The first device 102 can receive information in the first communication unit 316 from the second device transmission 310 of the network 104. The computing system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 4:
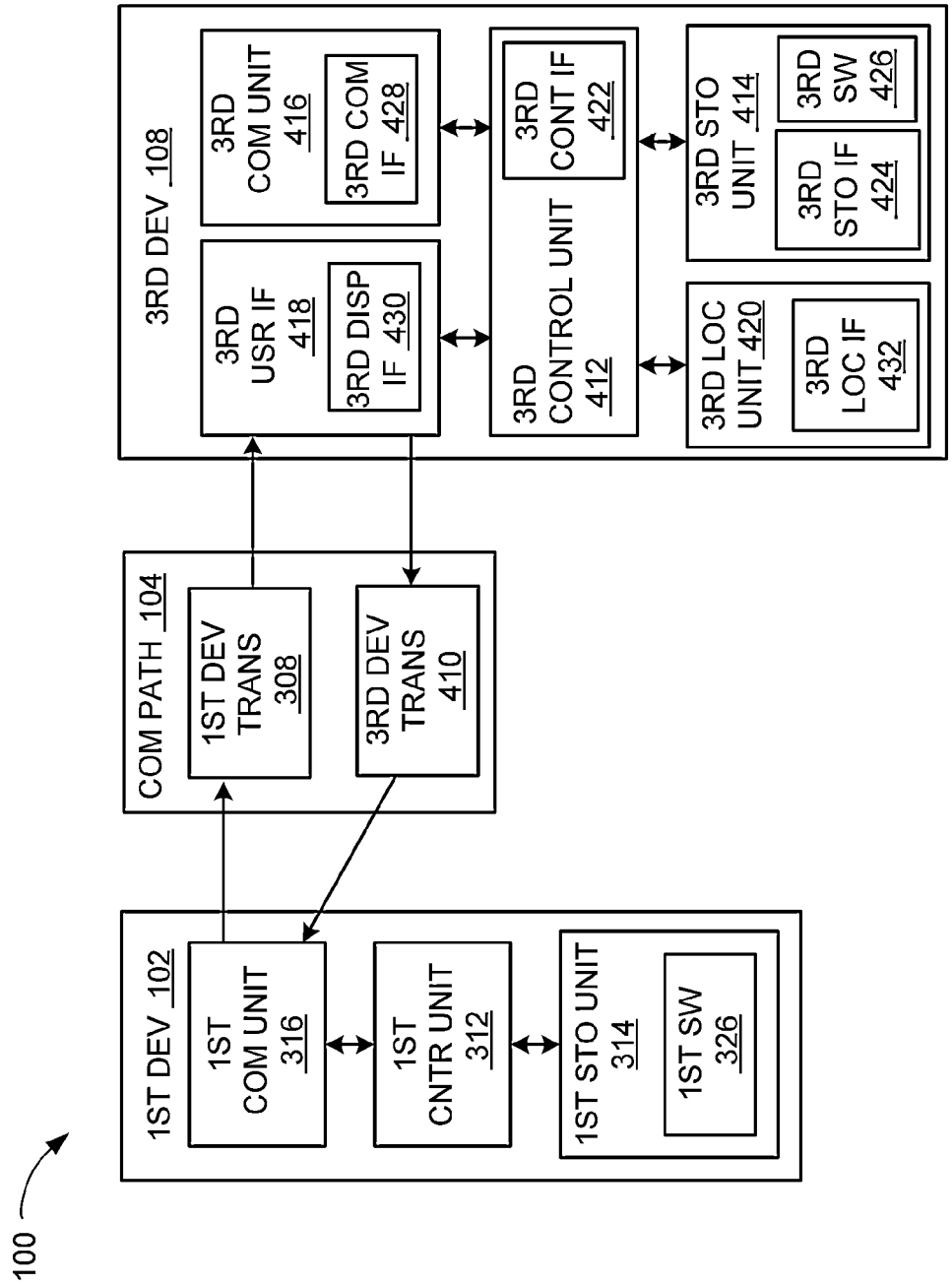
FIG. 4 is a further example block diagram of the computing system.

Referring now to FIG. 4, therein is shown a further exemplary block diagram of the computing system 100. Along with the first device 102, and the second device 106 of FIG. 3, the computing system 100 can include the third device 108. The first device 102 can send information in the first device transmission 308 over the network 104 to the third device 108. The third device 108 can send information in a third device transmission 410 over the network 104 to the first device 102, the second device 106, or a combination thereof.

For illustrative purposes, the computing system 100 is shown with the third device 108 as a client device, although it is understood that the computing system 100 can have the third device 108 as a different type of device. For example, the third device 108 can be a server.

Also for illustrative purposes, the computing system 100 is shown with the first device 102 communicating with the third device 108. However, it is understood that the second device 106, the fourth device 110, or a combination thereof can also communicate with the third device 108 in a similar manner as the communication between the first device 102 and the second device 106.

For brevity of description in this embodiment of the present invention, the third device 108 will be described as a client device. The embodiment of the present invention is not limited to this selection for the type of devices. The selection is an example of an embodiment of the present invention.

The third device 108 can be optimized for implementing an embodiment of the present invention in a multiple device or multiple user embodiments with the first device 102. The third device 108 can provide the additional or specific functions compared to the first device 102, the second device 106, or a combination thereof. The third device 108 can further be a device owned or used by a separate user different from the user of the first device 102.

The third device 108 can include a third control unit 412, a third storage unit 414, a third communication unit 416, a third user interface 418, and a third location unit 420. The third control unit 412 can include a third control interface 422. The third control unit 412 can execute a third software 426 to provide the intelligence of the computing system 100.

The third control unit 412 can be implemented in a number of different manners. For example, the third control unit 412 can be a processor, an application specific integrated circuit (ASIC) an embedded processor, a microprocessor, a hardware control logic, a hardware finite state machine (FSM), a digital signal processor (DSP), or a combination thereof. The third control interface 422 can be used for communication between the third control unit 412 and other functional units in the third device 108. The third control interface 422 can also be used for communication that is external to the third device 108.

The third control interface 422 can receive information from the other functional units or from external sources, or can transmit information to the other functional units or to external destinations. The external sources and the external destinations refer to sources and destinations external to the third device 108.

The third control interface 422 can be implemented in different ways and can include different implementations depending on which functional units or external units are being interfaced with the third control interface 422. For example, the third control interface 422 can be implemented with a pressure sensor, an inertial sensor, a microelectromechanical system (MEMS), optical circuitry, waveguides, wireless circuitry, wireline circuitry, or a combination thereof.

The third storage unit 414 can store the third software 426. The third storage unit 414 can also store the relevant information, such as data representing incoming images, data representing previously presented image, sound files, or a combination thereof.

The third storage unit 414 can be a volatile memory, a nonvolatile memory, an internal memory, an external memory, or a combination thereof. For example, the third storage unit 414 can be a nonvolatile storage such as non-volatile random access memory (NVRAM), Flash memory, disk storage, or a volatile storage such as static random access memory (SRAM). Also for example, the third storage unit 414 can be distribution of storage elements, multiple hierarchy storage system including different levels of caching, main memory, rotating media, or off-line storage, or a combination thereof.

The third storage unit 414 can include a third storage interface 424. The third storage interface 424 can be used for communication between the third storage unit 414 and other functional units in the third device 108. The third storage interface 424 can also be used for communication that is external to the third device 108.

The third storage interface 424 can receive information from the other functional units or from external sources, or can transmit information to the other functional units or to external destinations. The external sources and the external destinations refer to sources and destinations external to the third device 108.

The third storage interface 424 can include different implementations depending on which functional units or external units are being interfaced with the third storage unit 414. The third storage interface 424 can be implemented with technologies and techniques similar to the implementation of the third control interface 422.

The third communication unit 416 can enable external communication to and from the third device 108. For example, the third communication unit 416 can permit the third device 108 to communicate with the second device 106, the first device 102, the fourth device 110, a different device, an attachment, such as a peripheral device or a desktop computer, the network 104, or a combination thereof.

The third communication unit 416 can also function as a communication hub allowing the third device 108 to function as part of the network 104 and not limited to be an end point or terminal unit to the network 104. The third communication unit 416 can include active and passive components, such as microelectronics or an antenna, for interaction with the network 104.

The third communication unit 416 can include a baseband device or component, a modem, a digital signal processor, or a combination thereof for transmitting, formatting, receiving, detecting, decoding, further processing, or a combination thereof for communication signals. The third communication unit 416 can include one or more portions for processing the voltages, the currents, the digital information, or a combination thereof, such as an analog-to-digital converter, a digital-to-analog converter, a filter, an amplifier, a processor-type circuitry, or a combination thereof. The third communication unit 416 can further include one or more portions for storing information, such as cache or RAM memory, registers, or a combination thereof.

The third communication unit 416 can include a third communication interface 428. The third communication interface 428 can be used for communication between the third communication unit 416 and other functional units in the third device 108. The third communication interface 428 can receive information from the other functional units or can transmit information to the other functional units.

The third communication interface 428 can include different implementations depending on which functional units are being interfaced with the third communication unit 416. The third communication interface 428 can be implemented with technologies and techniques similar to the implementation of the third control interface 422.

The third user interface 418 allows a user (not shown) to interface and interact with the third device 108. The third user interface 418 can include an input device and an output device. Examples of the input device of the third user interface 418 can include a keypad, a touchpad, soft-keys, a keyboard, a microphone, an infrared sensor for receiving remote signals, or any combination thereof to provide data and communication inputs.

The third user interface 418 can include a third display interface 430. The third display interface 430 can include an output device. The third display interface 430 can include a display, a projector, a video screen, a speaker, or any combination thereof.

The third control unit 412 can operate the third user interface 418 to display information generated by the computing system 100. The third control unit 412 can also execute the third software 426 for the other functions of the computing system 100, including receiving location information from the third location unit 420. The third control unit 412 can further execute the third software 426 for interaction with the network 104 via the third communication unit 416.

The third location unit 420 can generate location information, current heading, current acceleration, and current speed of the third device 108, as examples. The third location unit 420 can be implemented in many ways. For example, the third location unit 420 can function as at least a part of the global positioning system, an inertial computing system, a cellular-tower location system, a pressure location system, or any combination thereof. Also, for example, the third location unit 420 can utilize components such as an accelerometer or GPS receiver.

The third location unit 420 can include a third location interface 432. The third location interface 432 can be used for communication between the third location unit 420 and other functional units in the third device 108. The third location interface 432 can also be used for communication external to the third device 108.

The third location interface 432 can receive information from the other functional units or from external sources, or can transmit information to the other functional units or to external destinations. The external sources and the external destinations refer to sources and destinations external to the third device 108.

The third location interface 432 can include different implementations depending on which functional units or external units are being interfaced with the third location unit 420. The third location interface 432 can be implemented with technologies and techniques similar to the implementation of the third control unit 412.

For illustrative purposes, the third device 108 is shown with the partition having the third user interface 418, the third storage unit 414, the third control unit 412, and the third communication unit 416, although it is understood that the third device 108 can have a different partition. For example, the third software 426 can be partitioned differently such that some or all of its function can be in the third control unit 412 and the third communication unit 416. Also, the third device 108 can include other functional units not shown in FIG. 4 for clarity.

The functional units in the third device 108 can work individually and independently of the other functional units. The third device 108 can work individually and independently from the first device 102, the second device 106, the fourth device 110, and the network 104.

For illustrative purposes, the computing system 100 is described by operation of the first device 102 and the third device 108. It is understood that the first device 102, the second device 106, the fourth device 110, and the third device 108 can operate any of the modules and functions of the computing system 100.

Figure 5:
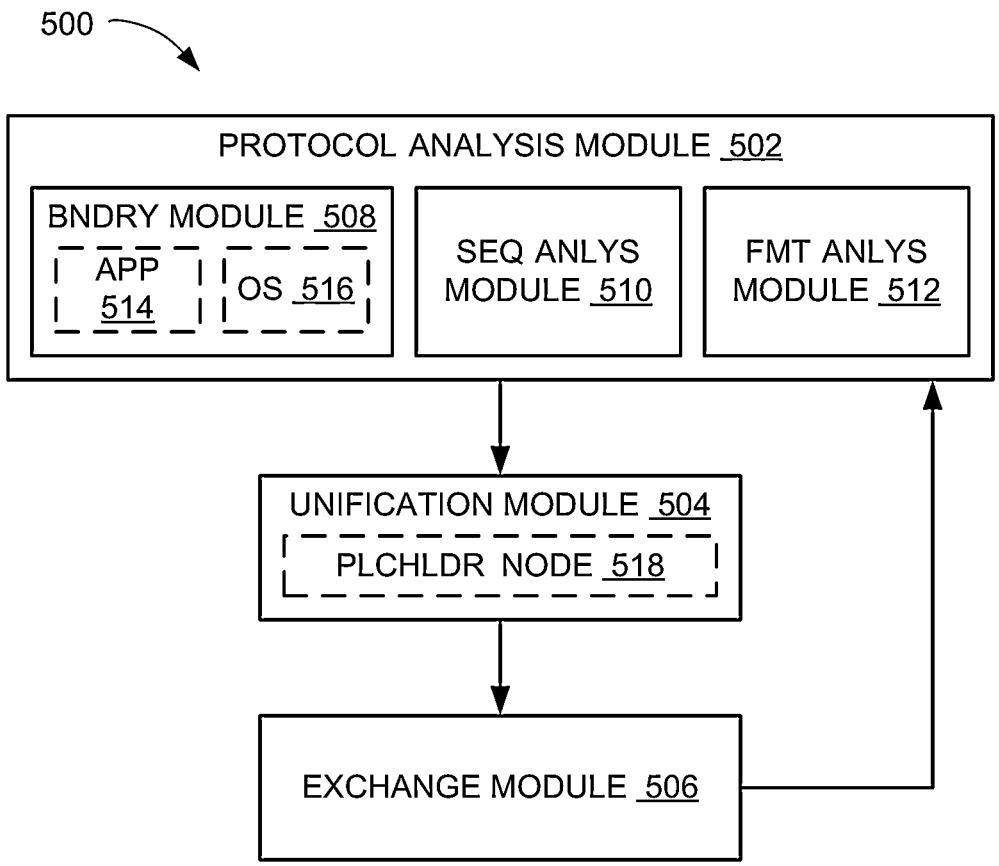
FIG. 5 is a control flow of the computing system.

Referring now to FIG. 5, therein is shown a control flow 500 of the computing system 100 of FIG. 1. The computing system 100 can include a protocol analysis module 502, a unification module 504, an exchange module 506, or a combination thereof.

The protocol analysis module 502 can be coupled to the unification module 504, the exchange module 506, or a combination thereof by having the input of one module connected to the output of another, such as by using wired or wireless connections, the network 104 of FIG. 1, instructional steps, process sequence, or a combination thereof. The unification module 504 can be similarly coupled to the exchange module 506.

The modules can be coupled directly, without any other intervening structures other than the structure providing the direct connection. The modules can further be coupled indirectly, through a shared connection or other functional structures between the coupled modules.

As a more specific example, one or more outputs of the protocol analysis module 502 can be connected, either directly or indirectly, to one or more inputs of the unification module 504 using conductors or wireless communication devices. The unification module 504 can similarly be connected to the exchange module 506, which can be similarly connected to the protocol analysis module 502.

The computing system 100 can operate a device, such as by displaying images, recreating sounds, executing or exchanging process steps or instructions, or a combination thereof with or based on the protocol analysis module 502, the unification module 504, the exchange module 506, or a combination thereof. The computing system 100 can also operate the device by having the device perform designated instructions, sending designated instructions to the device, or a combination thereof using one or more of the modules listed above.

The protocol analysis module 502 is configured to analyze the exchange protocol 236 of FIG. 2. The protocol analysis module 502 can determine the protocol profile 240 of FIG. 2 based on analyzing the exchange protocol 236.

For example, the protocol analysis module 502 can determine the protocol profile 240 including the first protocol 244 of FIG. 2 and the second protocol 246 of FIG. 2 for communicating between the first device 102 of FIG. 1, the second device 106 of FIG. 3, the third device 108 of FIG. 3, or a combination thereof. As a more specific example, the protocol analysis module 502 can determine the protocol profile 240 including the private sharing mechanism 248 of FIG. 2 for the first protocol 244, the vector testing mechanism 250 of FIG. 2 for the second protocol 246, or a combination thereof.

The protocol analysis module 502 can determine the protocol profile 240 by determining the profile boundary 242 of FIG. 2, the protocol sequence 252 of FIG. 2, the protocol scenario 254 of FIG. 2, the field format 256 of FIG. 2, or a combination thereof. The protocol analysis module 502 can include a boundary module 508, a sequence analysis module 510, a format analysis module 512, or a combination thereof for determining the protocol profile 240.

The boundary module 508 is configured to determine the profile boundary 242. The boundary module 508 can determine the profile boundary 242 based on a selection or a predetermination from the user, the computing system 100, a developer, or a combination thereof. The boundary module 508 can set the profile boundary 242 to one or more instance of an application 514, to an operating system 516, the social network service 202, or a combination thereof.

The application 514 is an individual set of instructions for performing a specific action. The application 514 can be can be software application or executable, a hardware accelerator, a hardware device, or a combination thereof. The application 514 can include an execution file used to realize or complete a user-initiated action for enabling the user to perform specific functions.

The operating system 516 is software controlling execution of the application 514. The operating system 516 can provide an environment for one or more instances of the application 514. The operating system 516 can include functions for integrating software instructions and hardware executions.

For illustrative purposes, the computing system 100 will be described as having the profile boundary 242 set to a single instance of the application 514 or a single instance of the social network service 202 independent of the operating system 516 for analyzing the instances of the exchange protocol 236 used therein. However, it is understood that the profile boundary 242 can be set to multiple instances of the application 514, the operating system 516, or a combination thereof for analyzing the instances of the exchange protocol 236 used therein.

The boundary module 508 can use the first user interface 318 of FIG. 3, the first communication unit 316 of FIG. 3, the second communication unit 336 of FIG. 3, the second user interface 338 of FIG. 3, the third communication unit 416 of FIG. 4, the third user interface 418 of FIG. 4, or a combination thereof to receive the selection for determining the profile boundary 242. The boundary module 508 can further use the first control interface 322 of FIG. 3, the second control interface 344 of FIG. 3, the third control interface 422 of FIG. 4, the first storage interface 324 of FIG. 3, the second storage interface 348 of FIG. 3, the third storage interface 424 of FIG. 4, or a combination thereof to access the predetermined selection for determining the profile boundary 242. The boundary module 508 can use the first control unit 312 of FIG. 3, the second control unit 334 of FIG. 3, the third control unit 412 of FIG. 3, or a combination thereof in addition to the above to determine the profile boundary 242 as the received or accessed selection.

The sequence analysis module 510 is configured to determine the protocol sequence 252, the protocol scenario 254 associated thereto, or a combination thereof used within the profile boundary 242. The sequence analysis module 510 can determine the protocol sequence 252 using a variety of methods.

For example, the sequence analysis module 510 can determine the protocol sequence 252 by testing the application 514 corresponding to the profile boundary 242. The sequence analysis module 510 can use inputs, functions, outputs, or a combination thereof for the application 514 as predetermined by the computing system 100, a provider or a developer of the application 514, the user or a combination thereof to test the application 514. The sequence analysis module 510 can further determine the conditions, the input-output relationship, or a combination thereof as the protocol scenario 254.

Also for example, the sequence analysis module 510 can determine the protocol sequence 252 and corresponding instance of the protocol scenario 254 by accessing the protocol sequence 252 provided by the computing system 100, a provider or a developer of the application 514, the user or a combination thereof. The sequence analysis module 510 can access stored instances of the protocol sequence 252, received communicated instances of the protocol sequence 252, or a combination thereof.

The sequence analysis module 510 can use the first control unit 312, the second control unit 334, the third control unit 412, the first communication unit 316, the second communication unit 336, the third communication unit 416, or a combination thereof to test the application 514 and determine the protocol sequence 252. The sequence analysis module 510 can store the protocol sequence 252 in the first storage unit 314 of FIG. 3, the second storage unit 346 of FIG. 3, the third storage unit 414 of FIG. 4, or a combination thereof. The sequence analysis module 510 can use the first communication interface 328 of FIG. 3, the second communication interface 350 of FIG. 3, the third communication interface 428 of FIG. 4, the first storage interface 324, the second storage interface 348, the third storage interface 424, or a combination thereof to access the protocol sequence 252.

The format analysis module 512 is configured to determine the field format 256, the protocol scenario 254 associated thereto, or a combination thereof used within the profile boundary 242. The format analysis module 512 can determine the field format 256 using methods similar to the sequence analysis module 510. For example, the format analysis module 512 can determine the field format 256 by testing the application 514 and analyzing exchanged contents similarly as described above. Also for example, the format analysis module 512 can access the field format 256 similarly as described above.

After determining the protocol profile 240, the control flow 500 can be passed to the unification module 504. The control flow 500 can pass through a variety of ways. For example, control flow 500 can pass by having processing results of one module passed to another module, such as by passing the protocol profile 240 from the protocol analysis module 502 to the unification module 504, by storing the processing results at a location known and accessible to the unification module 504, by notifying the unification module 504, such as by using a flag, an interrupt, a status signal, or a combination thereof, or a combination of processes thereof.

The unification module 504 is configured to generate the unified-protocol privacy mechanism 258 of FIG. 2. The unification module 504 can generate the unified-protocol privacy mechanism 258 based on the protocol profile 240.

For example, the unification module 504 can generate the unified-protocol privacy mechanism 258 by combining the instances of the exchange protocol 236 included in the protocol profile 240. As a more specific example, the unification module 504 can generate the unified-protocol privacy mechanism 258 by combining the first protocol 244 and the second protocol 246, including the private sharing mechanism 248, the vector testing mechanism 250, the Private Set Intersection Protocol, or a combination thereof.

The unification module 504 can generate the unified-protocol privacy mechanism 258 for the privacy protection scenario 228 of FIG. 2 instead of for improving efficiency, speed, or accuracy. For example, the unification module 504 can generate the unified-protocol privacy mechanism 258 for protecting the content information 216 from detection, access, inference thereof, or a combination thereof by the unintended observer 214 of FIG. 2.

Continuing with the example, the unintended observer 214 can determine or infer data regarding the content information 216 based on usage of the first protocol 244 or the second protocol 246 according to the protocol scenario 254. The unification module 504 can generate the unified-protocol privacy mechanism 258 for use across all instances of the protocol scenario 254 in places of all instances of the exchange protocol 236, including the first protocol 244 and the second protocol 246.

As a more specific example, the unintended observer 214 can determine the privacy rating 222 of FIG. 2 associated with the relevant location 218 shared as the content information 216 based on the exchange protocol 236 used to share the content information 216. Also as a more specific example, the unintended observer 214 can determine the account connection 208 of FIG. 2, including a nature or a degree of relationship, between the source account 210 of FIG. 2 and the receiver account 212 of FIG. 2 based on the exchange protocol 236 or the inferred instance of the privacy rating 222.

The unification module 504 can generate the unified-protocol privacy mechanism 258 independent of the privacy rating 222 associated with the relevant location 218. The unification module 504 can generate the unified-protocol privacy mechanism 258 having same instances of the unified sequence 260 of FIG. 2, the unified format 262 of FIG. 2, or a combination thereof regardless of the privacy rating 222.

The unification module 504 can generate the unified-protocol privacy mechanism 258 by generating the unified sequence 260, the unified format 262, or a combination thereof. The unification module 504 can generate the unified sequence 260, the unified format 262, or a combination thereof using a variety of methods.

For example, the unification module 504 can generate the unified sequence 260 by appending the protocol sequence 252 for one instance of the exchange protocol 236 to an end of the protocol sequence 252 for another instance of the exchange protocol 236. As a more specific example, the unification module 504 can generate the unified sequence 260 by adding the protocol sequence 252 of the second protocol 246, such as the vector testing mechanism 250, to the end of the protocol sequence 252 of the first protocol 244, such as the private sharing mechanism 248, or appending using a reversed order.

Also for example, the unification module 504 can generate the unified sequence 260 by alternating individual steps in the protocol sequence 252 for the instances of the exchange protocol 236. As a more specific example, the unification module 504 can generate the unified sequence 260 having the first individual step of the first protocol 244, followed by the first individual step of the second protocol 246, before executing the second individual step of the first protocol 244.

Also for example, the unification module 504 can identify common individual steps across the instances of the exchange protocol 236. The unification module 504 can combine the individual steps after matching the sequence or timing of the common individual steps, and by eliminating the redundant common individual steps.

As a more specific example, the first protocol 244 can include the individual steps A1, A2, A3, and A4, and the second protocol 246 can include the individual steps A0, B1, A2, B2, C1, A4, and B3. The unification module 504 can identify A2 and A4 common in both the first protocol 244 and the second protocol 246. The unification module 504 can align the two instances of the individual steps based on the common steps as exemplified below:

A1-A2-A3-A4

A0-B1-A2-B2-C1-A4-B3

Continuing with the specific example, the unification module 504 can then combine the individual steps between the common steps, such as by combining steps A0, A1, and B1, steps A3, B2, and C1, or a combination thereof. The unification module 504 can then generate the unified sequence 260 by only performing the common steps once.

Continuing with the example, the unification module 504 can combine the individual steps described above by appending the second protocol 246 to the end of the first protocol to generate A1, A0, B1, A2, A3, B2, C1, A4, and B3. The unification module 504 can alternatively combine the individual steps described above by alternating the individual steps with the second protocol 246 occurring before the first protocol 244 to generate A0, A1, B1, A2, B2, A3, C1, A4, and B3.

For illustrative purposes, the unification module 504 is described as generating the unified sequence 260 having the first protocol 244 before the second protocol 246. However, it is understood that the unification module 504 can have different ordering, such as having the second protocol 246 before the first protocol 244.

For further illustrative purposes, the unification module 504 is described as combining two instances of the exchange protocol 236. However, it is understood that the unification module 504 can combine any number of instances of the exchange protocol 236, such as for three or more, using the methods described above.

The unification module 504 can generate the unified format 262 using methods similar to ones described above. For example, the unification module 504 can generate the unified format 262 by appending the field format 256 for one instance of the exchange protocol 236 to the end of another, by alternating a portion or a unit in one instance of the exchange protocol 236 with another, or a combination thereof. Also for example, the unification module 504 can generate the unified format 262 by identifying the common portions or units, aligning and combining based on the common portions or units.

The unification module 504 can generate the unified-protocol privacy mechanism 258 utilizing the placeholder content 264 of FIG. 2, a placeholder node 518, or a combination thereof. The placeholder node 518 is a representation of a non-existing device necessary for unifying communication across multiple instances of the exchange protocol 236. The unification module 504 can generate the unified-protocol privacy mechanism 258 utilizing the placeholder node 518 for communicating the content information 216 between devices within the computing system 100.

For example, the placeholder node 518 can represent the first device 102, the second device 106, the third device 108, any other device there-between or in the network 104 of FIG. 1, or a combination thereof. As a more specific example, the first protocol 244 can include exchanges directly between the first device 102 and the third device 108 with the second device 106 or devices in the network 104 being passive or only passing the information there-through. The second protocol 246 can include exchanges between the first device 102 and the third device 108 with the second device 106 or the devices in the network 104 interacting and influencing the communication.

Continuing with the example, the unification module 504 can utilize the placeholder node 518 to account for the differences in the function of the second device 106 or the devices in the network 104. The unification module 504 can utilize the placeholder node 518 to replicate or eliminate the functions of the device existing in only part of the instances of the exchange protocol 236 within the protocol profile 240.

The unification module 504 can similarly generate the unified-protocol privacy mechanism 258 to utilize or include the placeholder content 264. For example, the unification module 504 can generate the unified-protocol privacy mechanism 258 to utilize or include the placeholder content 264 to replicate or eliminate data existing in only part of the instances of the exchange protocol 236 within the protocol profile 240.

For example, the unification module 504 can generate the unified-protocol privacy mechanism 258 to utilize the placeholder content 264 when exchanging data corresponding to the individual step of the exchange protocol 236 not applicable to the protocol scenario 254. As a more specific example, the protocol scenario 254 can require usage of one instance of the exchange protocol 236 but the unified-protocol privacy mechanism 258 can include the individual steps from the other instance of the exchange protocol 236. The unification module 504 can generate the unified-protocol privacy mechanism 258 to utilize the placeholder content 264 when exchanging data for the other instance of the exchange protocol 236 within the unified-protocol privacy mechanism 258

Continuing with the example listed above, the unification module 504 can generate the unified-protocol privacy mechanism 258 to utilize the placeholder content 264 for the individual steps A0, B1, B2, C1, and B3 in the unified-protocol privacy mechanism 258 when the protocol scenario 254 for the first protocol 244 is satisfied. The unification module 504 can generate the unified-protocol privacy mechanism 258 to utilize the placeholder content 264 for the individual steps A1 and A3 in the unified-protocol privacy mechanism 258 when the protocol scenario 254 for the second protocol 246 is satisfied.

The unification module 504 can generate the unified-protocol privacy mechanism 258 utilizing the placeholder content 264 independent of the content information 216. The unified-protocol privacy mechanism 258 can be independent of the content information 216 since the use of the placeholder content 264 allows for the usage of the unified-protocol privacy mechanism 258 regardless of satisfying any specific instance of the protocol scenario 254 and the corresponding instance of the exchange protocol 236 included in the protocol profile 240 as described above.

It has been discovered that the unified-protocol privacy mechanism 258 combining at least the first protocol 244 and the second protocol 246 for the privacy protection scenario 228 provides increased protection for the content information 216 from access by the unintended observer 214 of FIG. 2. The unified-protocol privacy mechanism 258 combining multiple instances of the exchange protocol 236 can use the unified sequence 260, the unified format 262, or a combination thereof regardless of the protocol scenario 254 corresponding to the combined instances of the exchange protocol 236. The uniformity can prevent the unintended observer from inferring data regarding the content information 216 exchanged using the unified-protocol privacy mechanism 258.

The unification module 504 can use the first control unit 312, the second control unit 334, the third control unit 412, or a combination thereof to generate the unified-protocol privacy mechanism 258. The unification module 504 can store the unified-protocol privacy mechanism 258 in the first storage unit 314, the second storage unit 346, the third storage unit 414, or a combination thereof.

After generating the unified-protocol privacy mechanism 258, the control flow 500 can be passed to the exchange module 506. The control flow 500 can pass similarly as described above between the protocol analysis module 502 and the unification module 504, but using the processing results of the unification module 504, such as the unified-protocol privacy mechanism 258.

The exchange module 506 is configured to communicate the content information 216 according to the unified-protocol privacy mechanism 258. The exchange module 506 can communicate the content information 216 between devices within the computing system 100, including the first device 102, the second device 106, the third device 108, or a combination thereof. For example, the exchange module 506 can communicate the content information 216 based the relevant location 218, the message 220, or a combination thereof.

The exchange module 506 can communicate the content information 216 by sending, receiving, processing or a combination thereof for the content information 216, header information associated thereto, protocol commands or replies, a portion therein, or a combination thereof according to the unified-protocol privacy mechanism 258. For example, the exchange module 506 can send, receive, process, or a combination thereof for the encryption key 234 of FIG. 2, the protocol key 238 of FIG. 2, a derivation thereof, or a combination thereof according to a specific order or circumstance as described by the unified-protocol privacy mechanism 258. Detailed example regarding the communication will be described below.

The exchange module 506 can further generate and utilize the cache-communication profile 266 of FIG. 2. The exchange module 506 can generate the cache-communication profile 266 using a method or a mechanism predetermined by the computing system 100, the user, or a combination thereof. The exchange module 506 can generate the cache-communication profile 266 to initiate the communication after the content origination time 224 of FIG. 2, at the content share time 226 of FIG. 2, when the online status 268 of FIG. 2 is offline, or a combination thereof.

The exchange module 506 can generate the cache-communication profile 266 to communicate the content information 216 or a portion therein at a time later than the content origination time 224, at the content share time 226, independent of the online status 268, or a combination thereof. The exchange module 506 can further generate the cache-communication profile 266 to communicate the placeholder content 264 in a similar manner.

For example, the exchange module 506 can generate the cache-communication profile 266 to communicate the content information 216, the placeholder content 264, such as random or fake sharings, or a combination thereof. The exchange module 506 can generate the cache-communication profile 266 to communicate the content information 216 from the first device 102 to the second device 106, from the second device 106 to the third device 108, or a combination thereof after the online status 268 goes offline, at a time later than the content origination time 224, at the content share time 226, over a period of time, or a combination thereof.

It has been discovered that the unified-protocol privacy mechanism 258 utilizing the placeholder content 264 provides increased security and robustness. The unified-protocol privacy mechanism 258 utilizing the placeholder content 264 can allow for integration between instances of the exchange protocol 236 having mismatching instances of the protocol sequence 252, the protocol scenario 254, the field format 256 or a combination thereof. The placeholder content 264 can be used to balance the mismatch in combining the instances of the exchange protocol 236 to protect inference from the unintended observer 214.

It has been discovered that the unified-protocol privacy mechanism 258 utilizing the placeholder node 518 provides increased security and robustness. The unified-protocol privacy mechanism 258 utilizing the placeholder node 518 can allow for integration between instances of the exchange protocol 236 having mismatching instances of communication parties, such as utilizing interaction from the server or having a passive instance of the server. The placeholder node 518 can be used to balance the mismatch in combining the instances of the exchange protocol 236 to protect inference from the unintended observer 214.

The exchange module 506 can generate the cache-communication profile 266 to control the content share time 226 for communicating the content information 216. The exchange module 506 can add a delay between the content origination time 224 and the content share time 226, between when the online status 268 goes offline and the content share time 226, or a combination thereof. The exchange module 506 can generate the delay according to a method or a mechanism predetermined by the computing system 100, the user, or a combination thereof.

It has been discovered that the cache-communication profile 266 utilizing the placeholder content 264 for the privacy protection scenario 228 provides increased protection. The cache-communication profile 266 utilizing the placeholder content 264 can provide communications that mimic exchanges to prevent the unintended observer 214 from determining the online status 268 of the user, determine the content share pattern 230, or a combination thereof.

The exchange module 506 can use the first control interface 322, the second control interface 344, the third control interface 422, the first communication interface 328, the second communication interface 350, the third communication interface 428, the first storage interface 324, the second storage interface 348, the third storage interface 424, or a combination thereof to access the method or the mechanism. The exchange module 506 can use the first control unit 312, the second control unit 334, the third control unit 412, or a combination thereof to generate the cache-communication profile 266.

The exchange module 506 can store the content information 216 in the first storage unit 314, the second storage unit 346, the third storage unit 414, or a combination thereof until the content share time 226 according to the cache-communication profile 266. The exchange module 506 can use the first communication unit 316, the second communication unit 336, the third communication unit 416, or a combination thereof to communicate the content information 216 according to the cache-communication profile 266.

The exchange module 506 can determine the communication history 270 of FIG. 2. The exchange module 506 can determine the communication history 270 by logging data regarding the communication or the exchange between devices.

Information or metadata regarding communications between devices, between the individual accounts 204 of FIG. 2, or a combination thereof can be passed to the protocol analysis module 502. The protocol analysis module 502 can use the communication information or metadata to further analyze the exchange protocol 236.

The control flow 500 or the method 500 of operation of the computing system 100 includes: determining a protocol profile including a first protocol and a second protocol for communicating between a first device and a second device; generating a unified-protocol privacy mechanism with a control unit for a privacy protection scenario, the unified-protocol privacy mechanism based on combining the first protocol and the second protocol; and communicating content information according to the unified-protocol privacy mechanism between the first device and the second device.

Figure 6:
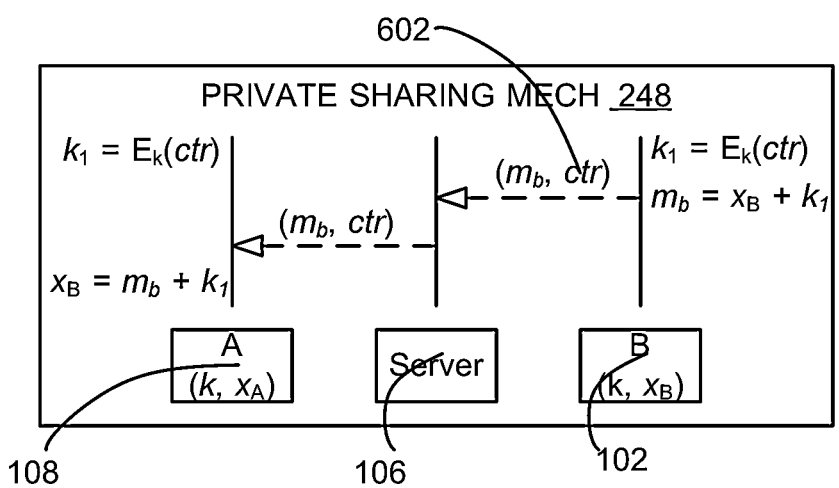
FIG. 6 is a detailed example of the private sharing mechanism.

Referring now to FIG. 6, therein is shown a detailed example of the private sharing mechanism 248. The private sharing mechanism 248 can include a two-party protocol with the relevant location 218 of FIG. 2, represented as '$x_B$' and '$x_A$'. The relevant location 218 can be encrypted by the source account 210 of FIG. 2, represented as 'B' for protecting the content information 216 of FIG. 2 from the unintended observer 214 of FIG. 2, including any server.

The source account 210 or a device associated therewith, such as the first device 102, the second device 106, the third device 108, or a combination thereof can encrypt the content information 216 using the content encryption mechanism 232 of FIG. 2. The source account 210 or the device associated therewith can mask the relevant location 218 with the output of the pseudorandom function (PRF), represented as 'E'. The bit size of the mask can be determined by the location precision, such as based on the privacy rating 222 of FIG. 2.

The computing system 100 of FIG. 1 can use the first control unit 312 of FIG. 3, the second control unit 334 of FIG. 3, the third control unit 412 of FIG. 4, or a combination thereof to encrypt the information. The computing system 100 can use a single encryption for the content encryption mechanism 232 for multiple sharing instances. For example, when the relevant location 218 is presented by 32-bits and E is 128-bit block cipher, such as AES, both the source account 210 and the receiver account 212 of FIG. 2, represented as 'A', can perform a single encryption of a counter value 602, represented as 'ctr' with a shared key, such as the encryption key 234 of FIG. 2, represented as 'k', and use selected blocks of the ciphertext therein, represented as '$k_1$', for masking.

For the private sharing mechanism 248, the server, such as the second device 106, can remain passive. The computing system 100 can include the server only transmitting or relaying the messages for the private sharing mechanism 248.

The computing system 100 can process the relevant location 218 when the users want to share their relevant location 218 with only their nearby contacts, such as within a circle of radius r, who have made their location visible, such as available, approximate, or nearby. Since the private sharing mechanism 248 includes unconditional sharing, requirement for the relevant location 218 for the account connection 208 of FIG. 2 or proximity thereof before the communication may not be utilized using the private sharing mechanism 248.

For example, when user A receives location information $x_B$ from user B, user A can determine that user B is nearby and decide to share his location information $x_A$. This can represent a natural interaction in a location sharing service. The private sharing mechanism 248 can still be used after checking a contact's location or proximity. However, the private sharing mechanism 248 can be more complicated when two users want to share their locations to each other only if the other is nearby.

Figure 7:
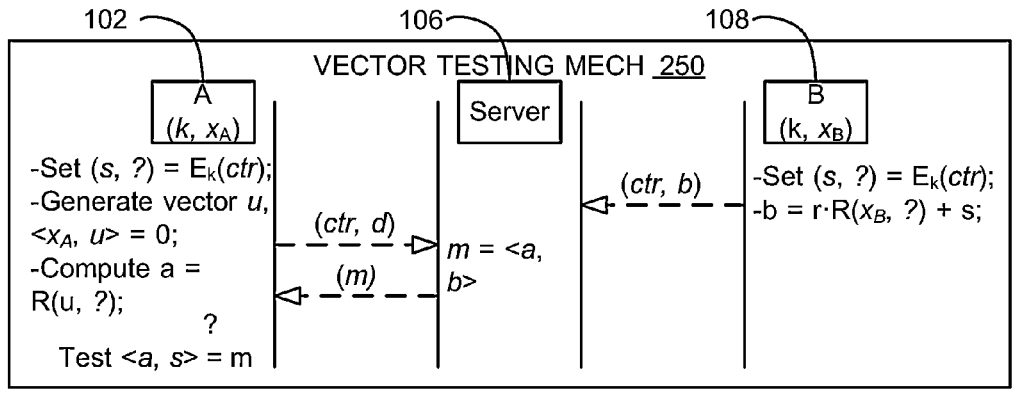
FIG. 7 is a detailed example of the vector testing mechanism.

Referring now to FIG. 7, therein is shown a detailed example of the vector testing mechanism 250. The computing system 100 of FIG. 1 can test whether the user or the device associated therewith, such as the first device 102, the third device 108, or a combination thereof, is within a given range, such as within a circle centered on a location. The proximity testing can involve distance calculations and comparisons. However, these calculations can be extremely expensive for the privacy protection scenario 228 of FIG. 2.

The computing system 100 can label the neighborhoods or geographical grids with some unique identifiers, and test the proximity by checking whether two person or objects have the same identifier. Various variants of Private Equality Testing (PET) schemes can be key ingredient used for testing the proximity in a private setting. The vector testing mechanism 250 can include a Vectorial Private Equality Testing as a lightweight three-party protocol based on symmetric-key primitives.

For example, the computing system 100 can include a situation where the source account 210 of FIG. 2 can share the content information 216 of FIG. 2 including the relevant location 218 of FIG. 2 with the receiver account 212 of FIG. 2 only if the receiver account 212 also shares the relevant location 218 thereof. Location values can be mapped to vectors using a vectorization process and these vectors can be masked using:

$$(s,\theta)=E_k(ctr). \qquad \text{Equation (1).}$$

The source account 210 can arrange the output of the PRF, represented as 'E', with 's' representing a vector having random entries and 'θ' representing a rotation angle.

The computing system 100 can use the source account 210 or the device associated therewith to calculate:

$$b=rR(x_B,\theta)+s. \qquad \text{Equation (2).}$$

A non-zero random number can be represented by 'r', and 's' can be based on the E function. The source account 210 can send 'b' and 'ctr' to the server, including the second device 106.

The receiver account 212, in order to compute whether the source account 210 or the device associate therewith is nearby, can first query the server to obtain the latest value of the counter value 602 of FIG. 6, represented as 'ctr', from the source account 210. The source account 210 can abort if the counter value 602 received through or from the second device 106, such as the server, is not fresh or recent. Otherwise, the receiver account 212 can compute '(s, θ)=$E_k$ (ctr)' and a unit vector 'u' perpendicular to '$x_A$'. The receiver account 212 can blind 'u' using the rotation function 'R', where 'θ' is pseudorandom value by definition. The receiver account 212 can send 'a=R(u, θ)' and the counter value 602 to the second device 106.

The second device 106 can match the messages having the same instance or value of the counter value 602 from the source account 210 and the receiver account 212. The second device 106 can perform a single inner product operation giving m=<a, b>, then send 'm' to the receiver account 212, with:

$$m=<a,b>=<R(u,\theta),rR(x_B,\theta)+s>=r<R(u,\theta),R(x_B,\theta)>+ \\ <R(u,\theta),s>. \qquad \text{Equation (3).}$$

Angle preserving map can be represented by 'R', and R($x_B$, θ) can be perpendicular to the vector R(u, θ) when the private values or vectors of the source account 210 and the receiver account 212 are same the same, such as "$x_A$=$x_B$".

The receiver account 212 can compute this value as it does not contain the blinding 'r'. The receiver account 212 can calculate <R(u, θ), s)>, and when the receiver account 212 finds that m=<R(u, θ), s)>, the receiver account 212 can learn that the user has the same private vector as the source account 210.

Figure 8:
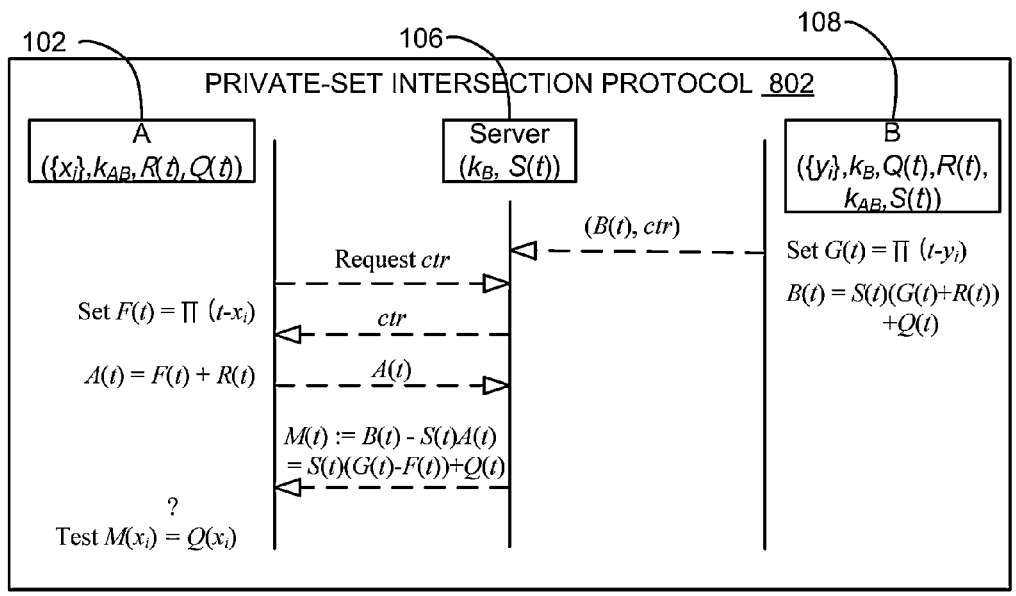
FIG. 8 is a detailed example of a private-set intersection protocol.

Referring now to FIG. 8, therein is shown a detailed example of a private-set intersection protocol 802. The private-set intersection protocol 802 can be an instance of the exchange protocol 236 of FIG. 2 similar to the vector testing mechanism 250 of FIG. 7. The private-set intersection protocol 802 can require larger data size as it is used in finding the intersection of two sets. The private-set intersection protocol 802 can allow two parties holding sets A and B to compute the intersection I=A∩B without revealing to the other party any additional information about their respective sets. Either party, or both, may learn the intersection depending on the application.

The source account 210 of FIG. 2 and the receiver account 212 of FIG. 2 can register and set up set up a shared key, represented by '$k_{user}$'. All communication between the source account 210, the receiver account 212, the server, or a combination thereof can be encrypted using the content encryption mechanism 232 of FIG. 2.

When the source account 210 and the receiver account 212 are connected through the account connection 208 of FIG. 2, the source account 210 and the receiver account 212 can set up a shared key, represented as '$k_{AB}$', such as the encryption key 234 of FIG. 2. The source account 210 and the receiver account 212 can maintain the counter value 602 of FIG. 6 for their correspondence, with initially setting of 0. The source account 210 and the receiver account 212 can utilized keyed PRF to secure the communication between parties.

For example, the source account 210 can start with computing $G(t)=\Pi_{i=0}^{n}(t-y_i)$ using a private set B= $\{y_1, y_2, \ldots, y_n\}$ having n elements. The source account 210 can compute the polynomials that required to hide G(t). The source account 210 can increment the counter value 602 and compute $E_{k_{AB}}(ctr)$ to get some pseudo random bytes and use these in generating the shared polynomials R(t) and Q(t). Using the same value of the counter value 602, the source account 210 can compute $E_{k_B}(ctr)$ to get some pseudo random bytes to generate the shared polynomial S(t) with the server, such as the second device 106.

Same polynomials R(t), Q(t), and S(t) can be required from the receiver account 212 and the server, respectively. The source account 210 can compute B(t)=S(t)(G(t)+R(t))+Q(t) and send it to the server.

Involvement of the receiver account 212 can consist of two stages: the receiver account 212 can query the server to obtain the latest value of the counter value 602 from the source account 210. If the value received is not fresh or current, such as when the receiver account 212 has previously used the counter value 602, the receiver account 212 can abort. The receiver account 212 can compute $E_{k_{AB}}(ctr)$ in order to generate the shared polynomials R(t) and Q(t). The receiver account 212 can further compute $(t)=\Pi_{i=0}^{m}(t-x_i)$ using a private set A=$\{x_1, x_2, \ldots, x_m\}$ having m elements and sends A(t)=F(t)+R(t) to the server.

The server can find the messages from the receiver account 212 and the source account 210 that have the same value for the counter value 602. The server, such as the social network service 202 of FIG. 2 or the second device 106, can compute:

$$M(t):=B(t)-S(t)A(t)=S(t)(G(t)-F(t))+Q(t). \qquad \text{Equation (4).}$$

The server can send 'M(t)' to the receiver account 212. The receiver account 212 can receive 'M(t)' from the server. The receiver account 212 can checks whether M(t) and Q(t) agrees with private values of the receiver account 212. The receiver account 212 can conclude that the values satisfying the equality are the values in the intersection. The receiver account 212 can learn the intersection, but not any other information regarding the private set of the source account 210.

Figure 9:
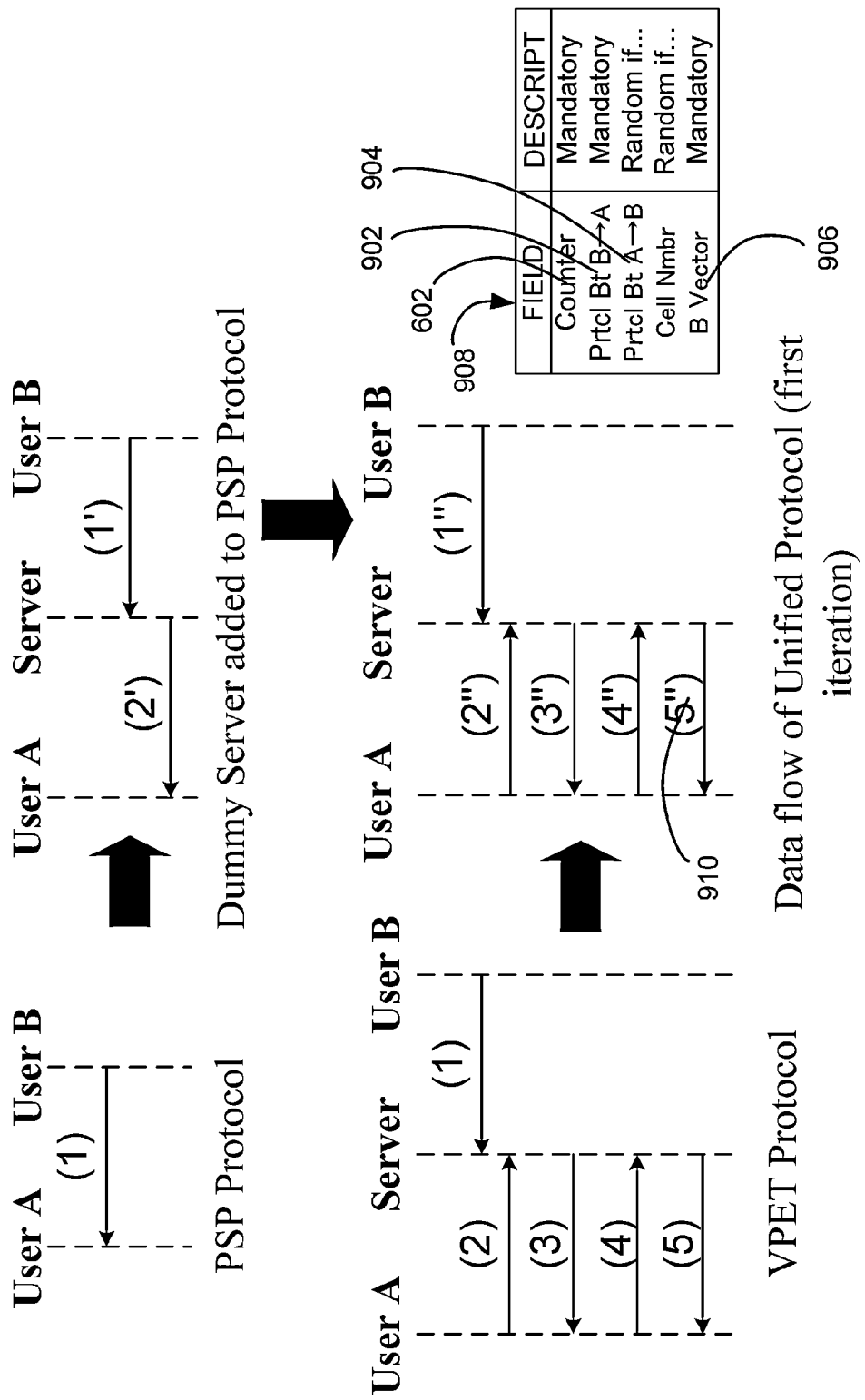
FIG. 9 is a detailed example of the unified-protocol privacy mechanism of FIG. 2.

Referring now to FIG. 9, therein is shown a detailed example of the unified-protocol privacy mechanism 258 of FIG. 2. The unification module 504 of FIG. 5 can generate the unified-protocol privacy mechanism 258 by combining instances of the exchange protocol 236 of FIG. 2 as described above. For example, the unification module 504 can combine the vector testing mechanism 250 of FIG. 2 of and the private sharing mechanism 248 of FIG. 2.

As a first step, the unification module 504 can combine the private sharing mechanism 248 and the vector testing mechanism 250, and then merge its results with the private-set intersection protocol 802 of FIG. 8. Since the private sharing mechanism 248 is a two-party protocol that simply encrypts the location information and passes to the communicating party, the unification module 504 can utilize the placeholder node 518.

The unification module 504 can further add a redundant request-response for the counter value 602 between the receiver account 212 and the server for matching the protocol sequence 252 of FIG. 2 or the traffic of the private sharing mechanism 248 and the vector testing mechanism 250. The unification module 504 can utilize the placeholder content 264 of FIG. 2 for the redundant request-response.

The unification module 504 can generate the unified-protocol privacy mechanism 258 of FIG. 2 with overloading specific location coordinates to carry special meaning. For example, the specific location coordinates can include 'not nearby', represented by '$x_n$', 'nearby', represented by '$x_y$', or 'invisible', represented by '$x_i$'. The unification module 504 can use the specific location as a dummy location through the placeholder content 264 of FIG. 2. For example, the placeholder content 264 can include longitudes larger than 180. The placeholder content 264 for the $x_i$ coordinate can be used with the private sharing mechanism 248 when the user wants to be invisible with respect to another user.

The unification module 504 can generate the unified-protocol privacy mechanism 258 including the unified format 262. The unified format 262 can include the counter value 602, a first direction field 902, a second direction field 904, a cell number, a vector 906, or a combination thereof. The counter value 602, the first direction field 902, the vector, or a combination thereof can be mandatory for a first iteration. The second direction field 904, the cell number, or a combination thereof can be random bit when the first direction field 902 indicates the private sharing mechanism 248.

The counter value 602 is a representation of a reference regarding the communication between the source account 210 and the receiver account 212. The counter value 602 can be a random value or a value starting from 0 and incrementing each time the source account 210 and the receiver account 212 communicates.

The first direction field 902 is a description of the instance of the exchange protocol 236 appropriate from the perspective of the source account 210. The second direction field 904 is a description of the instance of the exchange protocol 236 appropriate from the perspective of the receiver account 212. The first direction field 902, the second direction field 904, or a combination thereof can be based on the protocol scenario 254 for a corresponding instance of the exchange protocol 236 in comparison with previous usage, context, user selection, or a combination thereof.

The cell number can include an identification of a geographic area or a region having the source account 210, the receiver account 212, the device associated therewith, or a combination thereof therein. The vector 906 is the information intended for communication. The vector 906 can include the content information 216 of FIG. 2 or a portion therein. For example, the vector 906 can represent the relevant location 218.

The unification module 504 can generate the unified-protocol privacy mechanism 258 including the unified sequence 260 of FIG. 2 utilizing a payload matching process. The unification module 504 can utilize the payload matching process including a check-in process and a retrieval process for communicating an initial data 908. The initial data 908 can include data exchanged between devices for an initial iteration of the unified-protocol privacy mechanism 258.

The check-in process can be performed by the source account 210 of FIG. 2 to share the relevant location 218 of FIG. 2 with the receiver account 212 of FIG. 2. The receiver account 212 can perform the retrieval process to access the relevant location 218 from the source account 210. The retrieval process can be performed at any time after the check-in process regardless of the online status 268 of FIG. 2 of the source account 210.

The source account 210 and the receiver account 212 can share a key, represented as 'k', such as the protocol key 238 of FIG. 2. The source account 210 and the receiver account 212 can create a source key and a receiver key, such as '$k_1$' and '$k_2$', by encrypting the counter value 602 with the key. The unification module 504 can generate the unified-protocol privacy mechanism 258 to identify the protocol key 238 for communicating between the devices, generating the counter value 602 encrypted with the protocol key 238 for communicating the counter value 602 between the devices, or a combination thereof.

The check-in process can be based on the communication history 270 of FIG. 2 between the source account 210 and the receiver account 212. For example, the check-in process can determine an appropriateness, a previous usage, a preference, or a combination thereof for an instance of the exchange protocol 236, such as the vector testing mechanism 250 or the private sharing mechanism 248, for the first device 102, the second device 106, the third device 108, the source account 210, the receiver account 212, or a combination thereof.

The source account 210 can generate a random number for the counter value 602. The source account can encrypt the counter value 602 with the key 'k'. The source account 210 can communicate the counter value 602 to the server and two encrypted bits.

It has been discovered that the protocol key 238 provides increased level of security. The protocol key 238 shared between the source account 210 and the receiver account 212 can allow the usage of the unified-protocol privacy mechanism 258 for communicating only between the source account 210 and the receiver account 212. The source account 210 and the receiver account 212 can recognize and process the exchanged information according to a common instance of the unified sequence 260 or the unified format 262 for both the source account 210 and the receiver account 212 as accessed through the protocol key 238.

The two encrypted bits can include the first direction field 902 representing the privacy rating 222 of FIG. 2, for a granularity of the relevant location 218 shared with the source account 210. The first direction field 902 can further indicate whether the source account 210 can use the vector testing mechanism 250 or the private sharing mechanism 248. The first direction field 902 can be represented as '$b_{B\_A}$'.

The other bit of the two encrypted bits can include the second direction field 904 for representing a sharing granularity of the receiver account 212 toward the source account 210. The second direction field 904 can be based on the communication history 270, stored from the previous retrieval of the receiver account 212, such as for '$b_{A\_B}$'.

The unification module 504 can generate the unified-protocol privacy mechanism 258 to send 'r R($x_B$, θ)+s' to the server when the receiver account 212 and the source account 210 both reference the vector testing mechanism 250. The unification module 504 can generate the unified-protocol privacy mechanism 258 to send the encrypted instance of the relevant location 218 for the vector, represented by '($x_y \oplus k_1$, $k_2$)' or '$v_2 = (x_n \oplus k_1, k_2)$', based on the specific location coordinates indicating the receiver account 212 is 'nearby' the source account 210 when the receiver account 212 references the private sharing mechanism 248 and the source account 210 references the vector testing mechanism 250.

The unification module 504 can generate the unified-protocol privacy mechanism 258 to otherwise send the vector of '($x_B \oplus k_1$, $k_2$)'. The source account 210 can send 'invisible' or '$x_i$' for '$x_B$' for the 'invisible' status.

For the retrieval process, the receiver account 212 can acquire the content information 216 such as the relevant location 218 from the source account 210. The receiver account 212 can retrieve the counter value 602, '$b_{B\_A}$', '$b_{A\_B}$', or a combination thereof. The receiver account 212 can abort when '$b_{B\_A}$' indicates the vector testing mechanism 250 and '$b_{A\_B}$' is out of date or has expired.

Otherwise, the unification module 504 can generate the unified-protocol privacy mechanism 258 to proceed as in the vector testing mechanism 250 when both the receiver account 212 and the source account 210 indicate the vector testing mechanism 250. The unification module 504 can generate the unified-protocol privacy mechanism 258 to have the receiver account 212 send the vector '$v_1 = R(u, θ)$' to the server in such case.

The unification module 504 can generate the unified-protocol privacy mechanism 258 to send a random value for the vector, such as '($b_1$, $b_2$)' when at least one of the receiver account 212 or the source account 210 do not indicate the vector testing mechanism 250. The random value vector can correspond to a location through the vectorization process instead of a completely random vector.

After communicating the initial data 908, the unification module 504 can generate the unified-protocol privacy mechanism 258 to then have the server calculate a vector product 910, represented as 'm=<$v_1$, $v_2$>'. The vector product 910 is a processing result combining or encrypting one or more instances of the vector 906. The unification module 504 can generate the unified-protocol privacy mechanism 258 to have the first device 102, the third device 108, or a combination thereof to expect, receive, cooperate, or a combination thereof for a calculation of the vector product 910 by the second device 106.

The unification module 504 can generate the unified-protocol privacy mechanism 258 to have the second device 106 calculate the vector product 910. The unification module 504 can generate the unified-protocol privacy mechanism 258 to have the server send the vector product 910 to the receiver account 212 or the device associated therewith.

The unification module 504 can generate the unified-protocol privacy mechanism 258 to then have the receiver account 212 or the device associate therewith decrypt the vector product 910 to determine the vector 906 and receive the content information 216 transmitted by the source account 210. The receiver account 212 can calculate '<R(u, θ), s)>' when both the receiver account 212 and the source account 210 both indicate the vector testing mechanism 250. The receiver account 212 can determine that the source account 210 is nearby when '<R(u, θ), s)>' is equal to 'm'.

Otherwise, the unification module 504 can generate the unified-protocol privacy mechanism 258 to have the receiver account 212 receive 'm=$b_1(x_B \oplus k_1)+b_2k_2$'. The receiver account 212 can calculate '$x_B$'.

For the unified-protocol privacy mechanism 258, the server can calculate the vector product 910 regardless of the conditions. Moreover, the unification module 504 can generate the unified-protocol privacy mechanism 258 to keep the server from inferring data from the vector representing the content information 216.

The unification module 504 can generate the unified-protocol privacy mechanism 258 to further combine the private-set intersection protocol 802 of FIG. 8. The structure of the private-set intersection protocol 802 and the initial data 908 describe above can be the same, which results in no requirement for matching the protocol scenario 254. The unification module 504 can generate the unified-protocol privacy mechanism 258 to match the payload for unifying the private-set intersection protocol 802.

Matching the payload can be performed in a variety of ways. The unification module 504 can generate the unified-protocol privacy mechanism 258 to optimize the method, such as in terms of payload size as described above. The unification module 504 can further generate the unified-protocol privacy mechanism 258 by adding a further protocol field for representing the unified-protocol privacy mechanism 258 and an additional protocol field for sharing the polynomials, such as A(t) or B(t) described above. The unified sequence 260 can be same as the protocol sequence 252 of the unified-protocol privacy mechanism 258, but including the further protocol field and the additional protocol field for corresponding to the protocol scenario 254 for the private-set intersection protocol 802.

It has been discovered that the unified sequence 260 and the unified format 262 utilizing the first direction field 902, the second direction field 904, and the vector 906 provides increased protection for the content information 216 from access by the unintended observer 214 of FIG. 2. The first direction field 902, the second direction field 904, and the vector 906 can enable recognition and processing for the unified sequence 260 and the unified format 262 across multiple mismatching instances of the exchange protocol 236 for all available instances of the protocol scenario 254. The first direction field 902, the second direction field 904, and the vector 906 can be used to identify the content information 216 being shared using the unified-protocol privacy mechanism 258.

Figure 10:
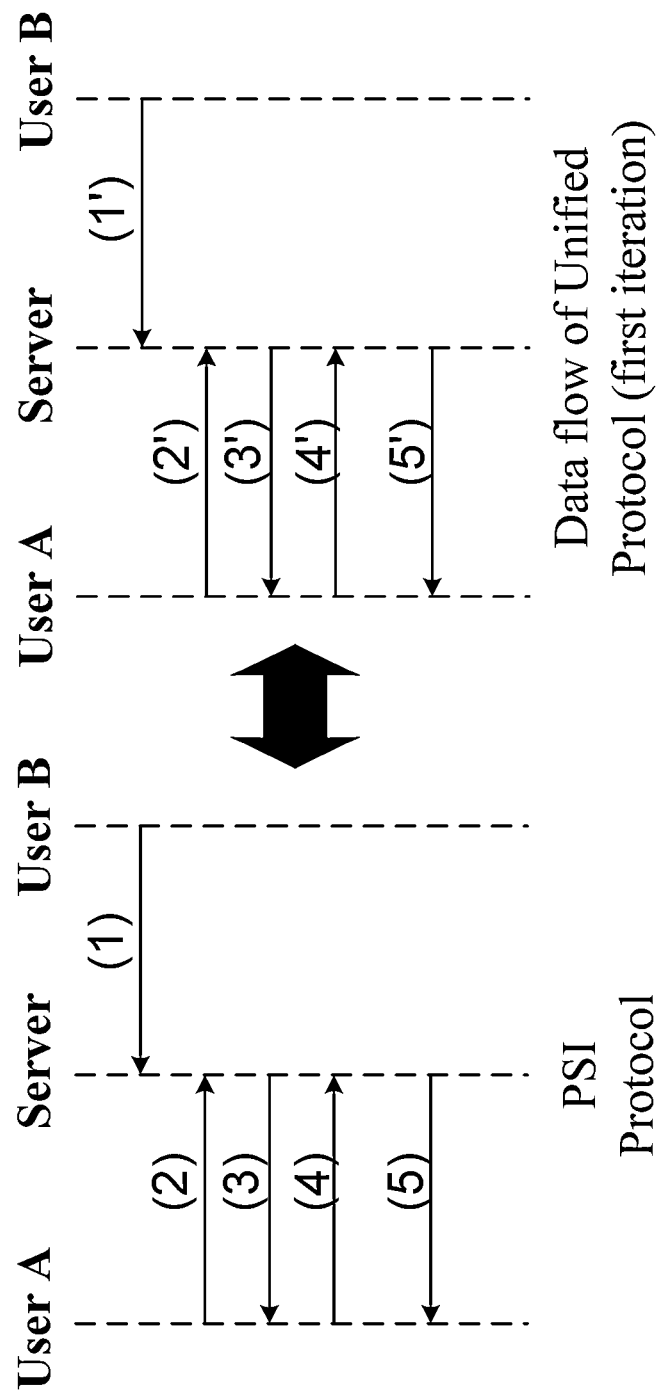
FIG. 10 is a further detailed example of the unified-protocol privacy mechanism of FIG. 2.

Referring now to FIG. 10, therein is shown a further detailed example of the unified-protocol privacy mechanism 258 of FIG. 2. The unification module 504 of FIG. 5 can generate the unified-protocol privacy mechanism 258 by combining instances of the exchange protocol 236 of FIG. 2 as described above.

For example, the unification module 504 can combine the private-set intersection protocol 802 of FIG. 8 to a combination of the vector testing mechanism 250 of and the private sharing mechanism 248 as described in FIG. 9. The unification module 504 can combine multiple protocols, such as for two or more protocols, inductively.

The unification module 504 can analyze and observe that a structure of the private-set intersection protocol 802 and the unified-protocol privacy mechanism 258 for unifying previous instances of the protocols can be the same. The unification module 504 can determine that the process for matching the traffic is unnecessary. The unification module 504 can match the payloads for providing protection against even an advanced adversary in determining which protocol is in use without authorization while communicating parties may be able to distinguish the protocols.

Matching the payloads can be done in many ways. For example, the unification module 504 add a protocol bit for the private-set intersection protocol 802 use and another component for sharing the polynomials such as 'A(t)' and 'B(t)' shown in FIG. 8.

The steps in the unified-protocol privacy mechanism 258 can be separated and handled disjoint. For example, assume that user B may have done a retrieval of A's preference at some point in the past, if A's preference is the private sharing mechanism 248 or the vector testing mechanism 250, the user B can assign random values to the "PSI Protocol bit" and "PSI polynomial" fields of the payload and performs the first iterated unified protocol on the remaining fields. If the protocol is the private sharing mechanism 248 then user B can use "PSI Protocol bit" and "PSI polynomial" fields to run the steps of the private sharing mechanism 248, other fields can be chosen randomly for matching the data sizes. During retrieval phase, user A can act accordingly and perform both protocols operations if it takes part in the underlying protocols.

The modules described herein can be hardware implementation or hardware accelerators, including passive circuitry, active circuitry, or both, in first communication unit 316 of FIG. 3, the second communication unit 336 of FIG. 3, the third communication unit 416 of FIG. 4, the first control unit 312 of FIG. 3, the second control unit 334 of FIG. 3, the third control unit 412 of FIG. 4, or a combination thereof. The modules can also be hardware implementation or hardware accelerators, including passive circuitry, active circuitry, or both, within the first device 102, the second device 106, the third device 108, or a combination thereof but outside of the first communication unit 316, the second communication unit 336, the third communication unit 416, the first control unit 312, the second control unit 334, the third control unit 412, or a combination thereof.

For illustrative purposes, the various modules have been described as being specific to the first device 102, the second device 106, the third device 108, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 314 of FIG. 3, the second storage unit 346 of FIG. 3, the third storage medium 414 of FIG. 4, or a combination thereof can represent the non-transitory computer readable medium. The first storage unit 314, the second storage unit 346, the third storage medium 414 or a combination thereof, or a portion therein can be removable from the first device 102, the second device 106, the third device 108, or a combination thereof. Examples of the non-transitory computer readable medium can be a non-volatile memory card or stick, an external hard disk drive, a tape cassette, or an optical disk.

The physical transformation from the unified-protocol privacy mechanism 258 results in the movement in the physical world, such as a makeup of the information exchanged between devices and a timing or a sequence thereof. The exchanged information can influence the user's movement, such as interacting with other users or availing contact or information to other users. Movement in the physical world results in changes to the account connection 208, the privacy rating 222, the protocol profile 240, or a combination thereof, which can be fed back into the computing system 100 to further process the unified-protocol privacy mechanism 258.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
a control unit including at least one processor configured to:
determine a protocol profile including a first protocol and a second protocol for communicating between a first device and a second device with each protocol including a unique order of communication exchanges between the first device and the second device according to a protocol scenario corresponding to each protocol,
generate a unified-protocol privacy mechanism based on combining the first protocol and the second protocol for implementing a common order of communication exchanges for both instances of the protocol scenario instead of the first protocol and the second protocol; and
a communication unit including microelectronics, coupled to the control unit, configured to communicate content information according to the unified-protocol privacy mechanism between the first device and the second device for both instances of the protocol scenario for preventing recognition of the content based on recognition of the unique order.

2. The system as claimed in claim 1 wherein:
the control unit is configured to generate a cache-communication profile controlling a content share time for communicating the content information;
the communication unit is configured to communicate the content information according to the cache-communication profile; and
further comprising:
a storage unit including memory, coupled to the control unit, configured to store the content information according to the cache-communication profile.

3. The system as claimed in claim 1 wherein the control unit is configured to generate the unified-protocol privacy mechanism utilizing a placeholder node for communicating the content information between the first device and the second device.

4. The system as claimed in claim 1 wherein:
the protocol profile includes a private sharing mechanism for the first protocol and a vector testing mechanism for the second protocol; and
the communication unit is configured to communicate the content information based on a relevant location.

5. The system as claimed in claim 1 wherein the control unit is configured to:
identify a protocol key for communicating between the first device and the second device; and
generate a counter value encrypted with the protocol key for communicating the counter value between the first device and the second device.

6. The system as claimed in claim 1 wherein the control unit is configured to generate the unified-protocol privacy mechanism independent of a privacy rating associated with a relevant location.

7. The system as claimed in claim 1 wherein the unified-protocol privacy mechanism includes a unified format for communicating a counter value, a first direction field, a second direction field, a vector, or a combination thereof.

8. The system as claimed in claim 1 the control unit is configured to generate the unified-protocol privacy mechanism including a unified sequence for communicating initial data, for calculating a vector product, for determining a vector, or a combination thereof.

9. The system as claimed in claim 1 wherein the control unit is configured to generate the unified-protocol privacy mechanism utilizing a placeholder content independent of the content information.

10. A method of operation of a computing system comprising:
determining a protocol profile including a first protocol and a second protocol for communicating between a first device and a second device with each protocol including a unique order of communication exchanges between the first device and the second device according to a protocol scenario corresponding to each protocol;
generating a unified-protocol privacy mechanism with a control unit based on combining the first protocol and the second protocol for implementing a common order of communication exchanges for both instances of the protocol scenario instead of the first protocol and the second protocol; and
communicating content information according to the unified-protocol privacy mechanism between the first device and the second device for both instances of the protocol scenario for preventing recognition of the content based on recognition of the unique order.

11. The method as claimed in claim 10 further comprising:
- generating a cache-communication profile controlling a content share time for communicating the content information;
- storing the content information according to the cache-communication profile; and wherein:
- communicating the content information includes communicating the content information according to the cache-communication profile.

12. The method as claimed in claim 10 wherein generating the unified-protocol privacy mechanism includes generating the unified-protocol privacy mechanism utilizing a placeholder content independent of the content information.

13. The method as claimed in claim 10 wherein generating the unified-protocol privacy mechanism includes generating the unified-protocol privacy mechanism utilizing a placeholder node for communicating the content information between the first device and the second device.

14. A non-transitory computer readable medium including instructions for a computing system comprising:
- determining a protocol profile including a first protocol and a second protocol for communicating between a first device and a second device with each protocol including a unique order of communication exchanges between the first device and the second device according to a protocol scenario corresponding to each protocol;
- generating a unified-protocol privacy mechanism based on combining the first protocol and the second protocol for implementing a common order of communication exchanges for both instances of the protocol scenario instead of the first protocol and the second protocol; and
- communicating content information according to the unified-protocol privacy mechanism between the first device and the second device for both instances of the protocol scenario for preventing recognition of the content based on recognition of the unique order.

15. The non-transitory computer readable medium as claimed in claim 14 further comprising:
- generating a cache-communication profile controlling a content share time for communicating the content information;
- storing the content information according to the cache-communication profile; and wherein:
- communicating the content information includes communicating the content information according to the cache-communication profile.

16. The non-transitory computer readable medium as claimed in claim 14 wherein generating the unified-protocol privacy mechanism includes generating the unified-protocol privacy mechanism utilizing a placeholder content independent of the content information.

17. The non-transitory computer readable medium as claimed in claim 14 wherein generating the unified-protocol privacy mechanism includes generating the unified-protocol privacy mechanism utilizing a placeholder node for communicating the content information between the first device and the second device.

* * * * *